United States Patent
Kobayashi

(10) Patent No.: US 11,518,339 B2
(45) Date of Patent: Dec. 6, 2022

(54) SIDE AIR BAG DEVICE

(71) Applicant: Yuto Kobayashi, Yokohama (JP)

(72) Inventor: Yuto Kobayashi, Yokohama (JP)

(73) Assignee: Autoliv Development AB, Vargarda (SE)

( * ) Notice: Subject to any disclaimer, the term of this patent is extended or adjusted under 35 U.S.C. 154(b) by 206 days.

(21) Appl. No.: 16/472,947

(22) PCT Filed: Nov. 30, 2017

(86) PCT No.: PCT/JP2017/043051
§ 371 (c)(1),
(2) Date: Jun. 24, 2019

(87) PCT Pub. No.: WO2018/123427
PCT Pub. Date: Jul. 5, 2018

(65) Prior Publication Data
US 2019/0359165 A1 Nov. 28, 2019

(30) Foreign Application Priority Data
Dec. 26, 2016 (JP) .............................. JP2016-250629

(51) Int. Cl.
*B60R 21/231* (2011.01)
*B60R 21/233* (2006.01)
(Continued)

(52) U.S. Cl.
CPC ...... *B60R 21/23138* (2013.01); *B60R 21/233* (2013.01); *B60R 21/237* (2013.01);
(Continued)

(58) Field of Classification Search
CPC ............ B60R 21/23138; B60R 21/233; B60R 2021/23146; B60R 2021/23324; B60R 2021/23382; B60R 21/2338
See application file for complete search history.

(56) References Cited

U.S. PATENT DOCUMENTS 8,783,712 B2 7/2014 Fukushima et al.
9,376,083 B2 * 6/2016 Yamanaka ............ B60R 21/207
(Continued)

FOREIGN PATENT DOCUMENTS

JP 201431051 A 2/2014
JP 2014031096 A 2/2014
(Continued)

OTHER PUBLICATIONS

International Search Report (in English and Japanese) and Written Opinion (in Japanese) issued in PCT/JP2017/043051, dated Jan. 9, 2018; ISA/JP.

*Primary Examiner* — James A English
*Assistant Examiner* — Joselynn Y Sliteris
(74) *Attorney, Agent, or Firm* — Harness, Dickey & Pierce, P.L.C.; Stephen T. Olson

(57) ABSTRACT

A side airbag device for restraining an occupant at an early stage by changing a thickness of a chamber includes a cushion formed in a bag shape by combining an outer panel located at an outer side in a vehicle width direction and an inner panel located at an inner side in the vehicle width direction. A baffle spans between the outer panel and the inner panel in an inside of the cushion and partitions the inside of the cushion into a front chamber located at a vehicle front side and a rear chamber located at a vehicle rear side. An inflator is disposed in the rear chamber, and a first tether and a second tether extend from the baffle toward a vehicle rear. The tethers respectively extend from the baffle via both sides of the inflator in the vehicle width direction so as to be connected with a rear end of the cushion.

17 Claims, 14 Drawing Sheets

(51) Int. Cl.
 *B60R 21/237* (2006.01)
 *B60R 21/2338* (2011.01)
(52) U.S. Cl.
 CPC ............ *B60R 21/2338* (2013.01); *B60R 2021/23146* (2013.01); *B60R 2021/23324* (2013.01); *B60R 2021/23382* (2013.01)

(56) References Cited

U.S. PATENT DOCUMENTS

| | | | | |
|---|---|---|---|---|
| 9,505,369 | B2 * | 11/2016 | Iida | B60R 21/23138 |
| 9,505,375 | B2 * | 11/2016 | Kobayashi | B60R 21/239 |
| 9,533,605 | B2 * | 1/2017 | Fujiwara | B60R 21/239 |
| 9,598,043 | B2 | 3/2017 | Kobayashi et al. | |
| 9,669,789 | B2 | 6/2017 | Fujiwara | |
| 9,688,234 | B2 * | 6/2017 | Yamanaka | B60R 21/2338 |
| 9,821,749 | B2 | 11/2017 | Hotta et al. | |
| 9,849,857 | B2 | 12/2017 | Fujiwara | |
| 9,932,011 | B2 * | 4/2018 | Hiraiwa | B60R 21/207 |
| 9,969,348 | B2 | 5/2018 | Fujiwara | |
| 10,017,144 | B2 * | 7/2018 | Mizuno | B60R 21/237 |
| 10,308,206 | B2 | 6/2019 | Fujiwara | |
| 10,640,073 | B2 * | 5/2020 | Nukaya | B60R 21/207 |
| 2014/0035264 | A1 | 2/2014 | Fukushima et al. | |
| 2015/0367804 | A1 | 12/2015 | Fujiwara | |
| 2015/0367811 | A1 * | 12/2015 | Kobayashi | B60R 21/239 280/730.2 |
| 2016/0031407 | A1 * | 2/2016 | Yamanaka | B60R 21/2338 280/728.2 |
| 2016/0075303 | A1 * | 3/2016 | Iida | B60R 21/2338 280/729 |
| 2016/0159310 | A1 | 6/2016 | Kobayashi et al. | |
| 2016/0159313 | A1 | 6/2016 | Fujiwara | |
| 2016/0368449 | A1 | 12/2016 | Fujiwara | |
| 2017/0008481 | A1 | 1/2017 | Hotta et al. | |
| 2017/0182969 | A1 | 6/2017 | Fujiwara | |
| 2021/0138993 | A1 * | 5/2021 | Kobayashi | B60R 21/207 |

FOREIGN PATENT DOCUMENTS

| | | |
|---|---|---|
| JP | 201513500 A | 1/2015 |
| JP | 201530322 A | 2/2015 |
| JP | 20167901 A | 1/2016 |
| JP | 201660481 A | 4/2016 |
| JP | 201713746 A | 1/2017 |
| JP | 201774850 A | 4/2017 |
| WO | WO-2015020052 A1 | 2/2015 |

* cited by examiner

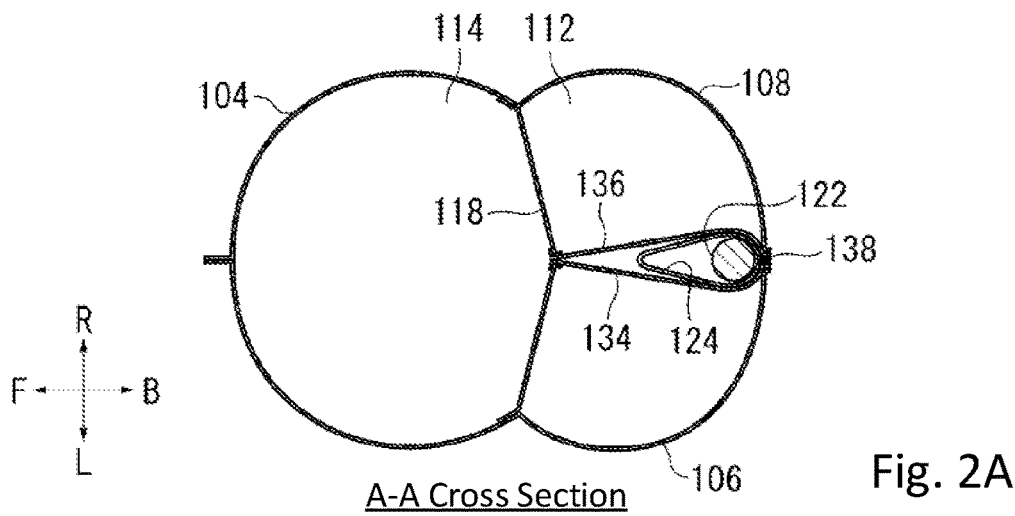
Fig. 2A — A-A Cross Section
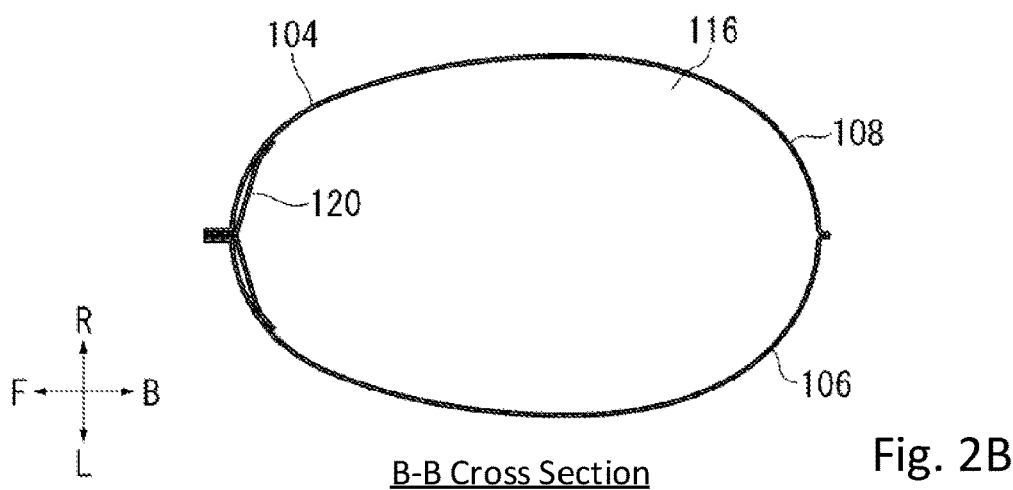
Fig. 2B — B-B Cross Section
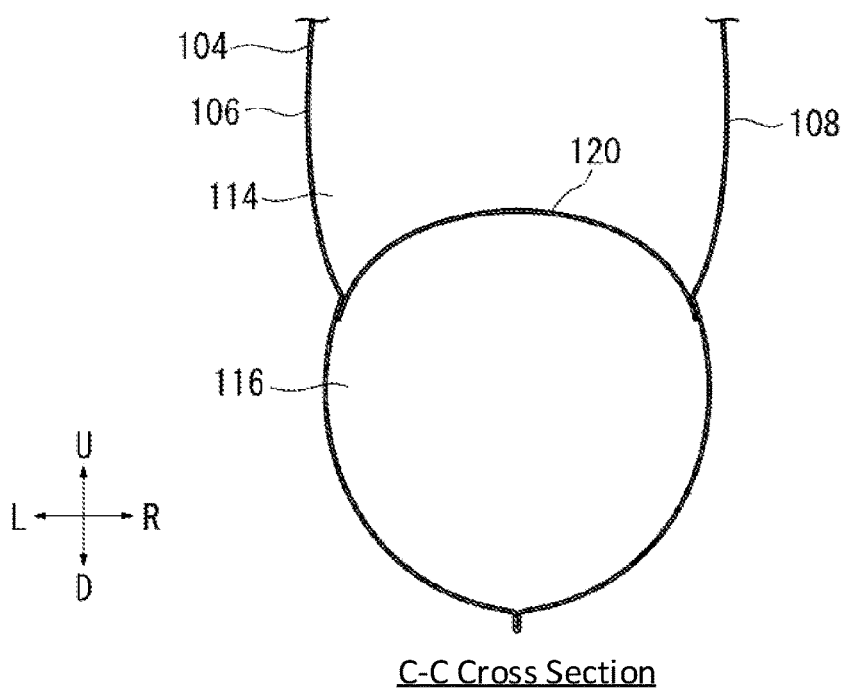
Fig. 2C — C-C Cross Section

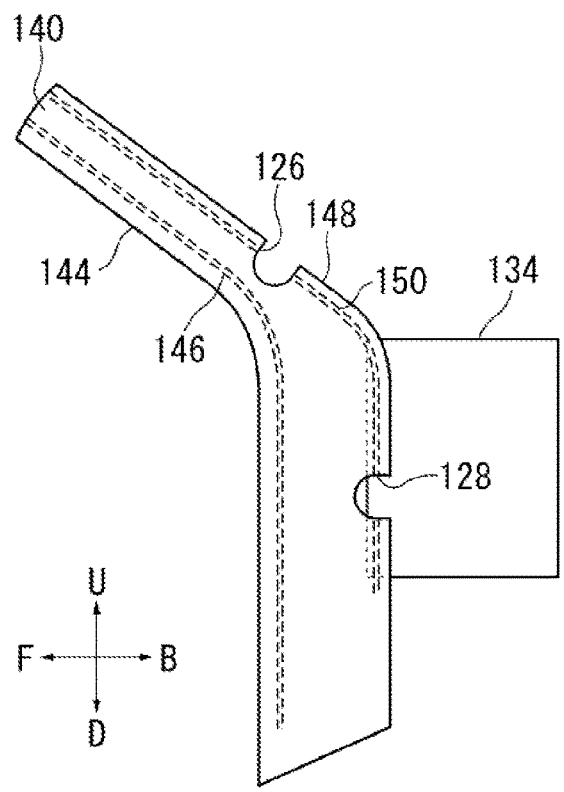
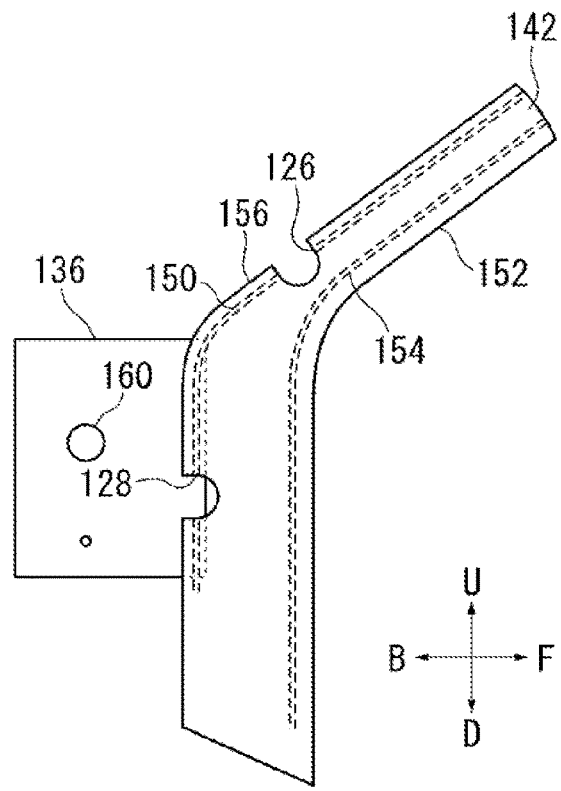
Fig. 5A
Fig. 5B
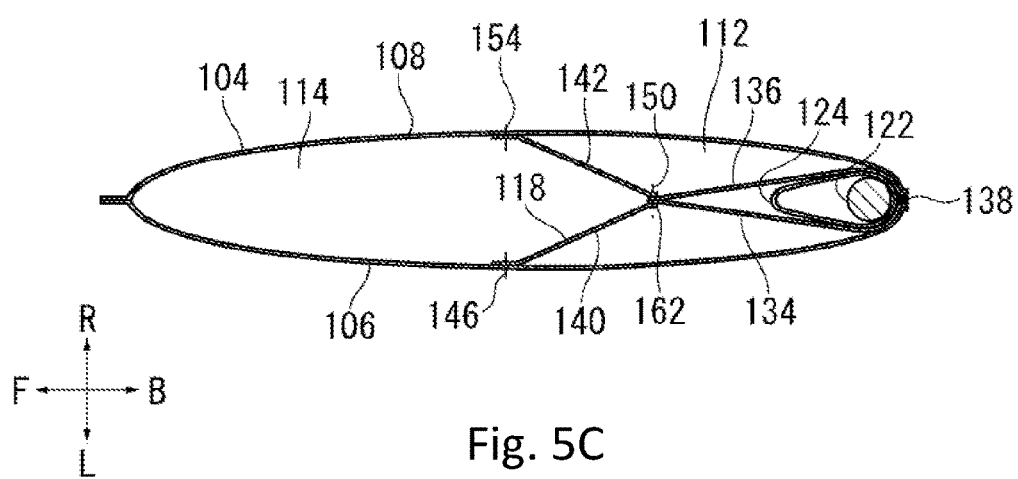
Fig. 5C

SIDE AIR BAG DEVICE

CROSS-REFERENCE TO RELATED APPLICATIONS

This application is a 371 U.S. National Phase of International Application No. PCT/JP2017/043051, filed Nov. 30, 2017, which claims priority to Japanese Patent Application No. 2016-250629, filed Dec. 26, 2016. The entire disclosures of the above applications are incorporated herein by reference.

TECHNICAL FIELD

The present invention relates to a side airbag device that restrains a vehicle occupant from a side.

BACKGROUND ART

In the recent years, an airbag device is mostly equipped with a vehicle as the standard equipment. The airbag device is a safety device being operated in an emergency such as a vehicle collision and protects an occupant by expanding and deploying an airbag cushion (simply described as a "cushion" below) with a gas pressure so as to receive the occupant.

There are various kinds of airbag devices according to the installation positions and the use. For instance, a front airbag device is provided at a center of a steering wheel so that a driver can be protected from a collision occurred from the forward and backward directions. In addition, in order to protect an occupant from an impact in a vehicle width direction by such as a side collision, a curtain airbag device is provided near a ceiling above a side window and a side airbag device is provided at a side part of a seat.

With respect to a cushion of an airbag device, in accordance with the various conditions such as a body part of an occupant being restrained and a method of the expansion and deployment, there is a case in which an inside of the cushion is partitioned into a plurality of rooms (also referred to as a "chamber"). For instance, a cushion (the side airbag 20) that is described in Patent Document 1 is partitioned into the front side bag part 26 that is expanded under an upper arm of an occupant and the rear side bag part 28 that is expanded near a shoulder and a chest of the occupant. Patent Document 1 has a configuration in which after the upper arm is pushed up by increasing the internal pressure of the front side bag part 26 at an early stage, the shoulder and the chest and so on are restrained by the rear side bag part 28.

PRIOR ART DOCUMENT

Patent Document

Patent Document 1: Japanese Patent Publication Number 2014-31051.

SUMMARY OF THE INVENTION

Problems to be Solved by the Invention

In Patent Document 1, as shown in FIGS. 3 and 4, a base cloth that configures an outer surface of the side airbag 20 is cut into a plurality of parts according to the shape of the front side bag part 26 and the rear side bag part 28. The front side bag part 26 and the rear side bag part 28 mentioned above are bags that are configured with the base cloths being independently provided each other and the thicknesses in a vehicle width direction are different (refer to FIG. 9). However, unlike the configuration in Patent Document 1, there is also a case in which the entirety of the outer surface of the cushion is configured with a pair of base cloths (an outer panel and an inner panel) in the vehicle width direction. In this case, the cushion that is apparently simpler in configuration can be realized. However, because it is not easy to change the thickness of every chamber, a suitable contrivance is required.

The present invention attempts to solve these problems. An object of the present invention is to provide a side airbag device that can restrain an occupant at an early stage by changing a thickness of a chamber.

Means for Solving the Problems

In order to solve the above problems, a representative configuration of a side airbag device according to the present invention includes: an airbag cushion that is formed in a bag shape by combining an outer panel located at an outer side in a vehicle width direction and an inner panel located at an inner side in the vehicle width direction; a baffle that spans between the outer panel and the inner panel in an inside of the airbag cushion, the baffle partitioning the inside of the airbag cushion into a front chamber located at a vehicle front side and a rear chamber located at a vehicle rear side; an inflator that is disposed in the rear chamber; and a plurality of tethers that extends from the baffle toward a vehicle rear. The plurality of tethers includes first and second tethers that respectively extend from the baffle via both sides of the inflator in the vehicle width direction so as to be connected with a rear end of the airbag cushion.

According to the configuration explained above, when the airbag cushion starts to be expanded, the baffle is pulled toward the vehicle rear side by the tether. As a result, since the spread of the rear chamber in a vehicle longitudinal direction is limited, the rear chamber rapidly becomes thick in the vehicle width direction. Because the rear chamber is located closer to an occupant than the front chamber, according to the configuration explained above, the occupant can be restrained by the high restraint force by the rear chamber that is thick in the vehicle width direction at an early stage after the impact is detected. Further, according to the configuration explained above, because the shape of the airbag cushion is limited in the vehicle longitudinal direction, when the airbag cushion comes in contact with the occupant, who is located at a non-normal position, from the vehicle rear, for instance, an input load that that can be given to the occupant can be suppressed.

The baffle explained above includes first and second members that are independently provided as cloth materials. Each of the first and second members is a band-shaped member. One sides of longitudinal sides of the band-shaped members are respectively connected to the outer panel and the inner panel. The other sides of the longitudinal sides of the band-shaped members are connected to each other. The baffle may be mountain-fold-shaped as the other sides form an apex when viewed from a vehicle rear side prior to an expansion and deployment of the airbag cushion. According to the configuration explained above, the baffle that is easily folded and wound and so on can be suitably realized.

The first and second tethers explained above may be connected to the apex of the other sides. According to the tethers that have this configuration, it becomes possible that the baffle is suitably pulled.

The first and second tethers explained above may respectively continuously extend from the other sides of the first and second members as parts of the baffle. According to the tethers that have this configuration, it becomes possible that the baffle is also suitably pulled.

The baffle explained above may be mountain-fold-shaped with respect to a fold that extends in a vehicle up and down direction when viewed from the vehicle front side prior to an expansion and deployment of the airbag cushion. Further, the first and second tethers may be respectively connected to both edges of the baffle in the vehicle width direction. According to the configuration explained above, the baffle that is easily folded and wound and so on and the tethers that pull the baffle can also be suitably realized.

The baffle explained above may be mountain-fold-shaped with respect to the fold that extends in the vehicle up and down direction when viewed from the vehicle front side prior to the expansion and deployment of the airbag cushion. Further, the first and second tethers may respectively continuously extend from the both edges of the baffle in the vehicle width direction as parts of the baffle. According to the configuration explained above, the baffle that is easily folded and wound and so on and the tethers that pull the baffle can also be suitably realized.

It is preferably that lengths of the first and second tethers explained above are shorter than lengths from connection points between the baffle and the outer and inner panels to the rear end of the airbag cushion. According to the tethers that have this configuration, it becomes possible that the baffle is suitably pulled.

Effects of the Invention

According to the present invention, it is possible to provide a side airbag device that can restrain an occupant at an early stage by changing a thickness of a chamber.

BRIEF DESCRIPTION OF THE DRAWINGS

FIGS. 2A, 2B, and 2C are schematic cross-sectional views of a cushion shown in FIG. 1B.

FIGS. 5A, 5B, and 5C are diagrams that exemplarily show a baffle and tethers shown in, for instance, FIG. 3.

EXPLANATION OF REFERENCE SIGNS

Figure 1A:
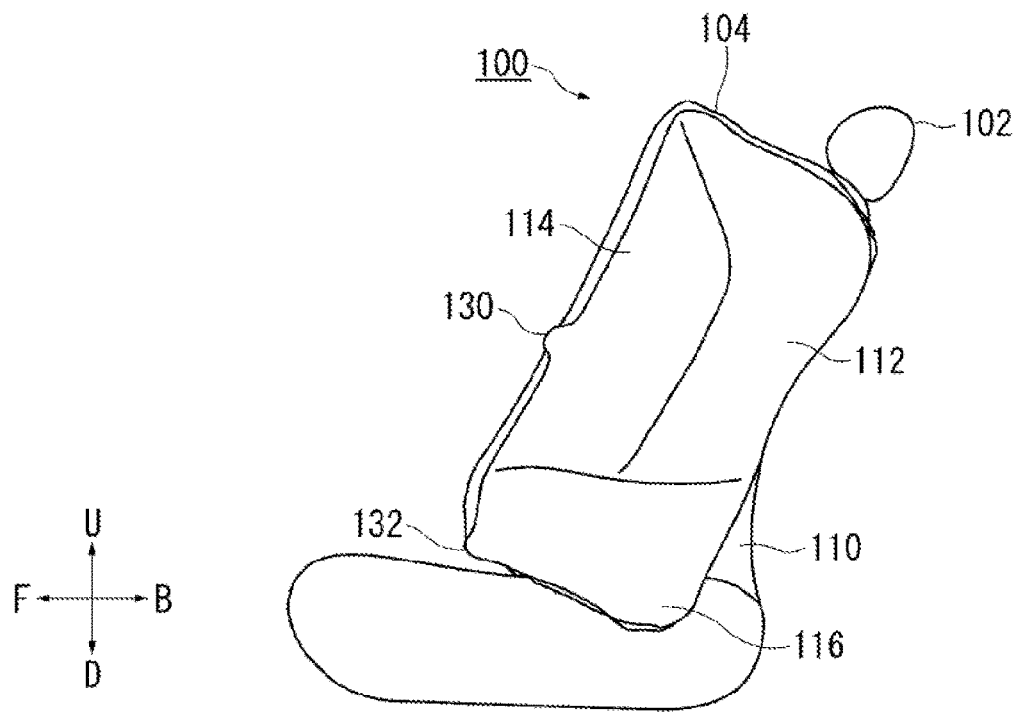
FIGS. 1A and 1B are diagrams that exemplarily show a side airbag device according to a first embodiment of the present invention.

100—Side Airbag Device of First Embodiment, 102—Seat, 104—Cushion, 106—Outer Panel, 108—Inner Panel, 110—Seatback, 112—Rear Chamber, 114—Front Chamber, 116—Lower Chamber, 118—Baffle, 120—Lower Baffle, 122—Inflator, 124—Inner Tube, 126—Vent Hole at Upper Side, 128—Vent Hole at Lower Side, 130—Outer Vent at Upper Side, 132—Outer Vent at Lower Side, 134—First Tether, 136—Second Tether, 138—Rear End of Cushion, 140—First Member of Baffle, 142—Second Member of Baffle, 144—One Side of First Member, 146—Sewing Part, 148—Other Side of First Member, 150—Sewing Part, 152—One Side of First Member, 154—Sewing Part, 156—Other Side of Second Member, 160—Hole, 162—Apex of Baffle, 170—Cushion of Variation of First Embodiment, 172—Baffle, 174—First Tether, 176—Second Tether, 178—First Member of Baffle, 179—Band-Shaped Part of First Member, 180—Second Member of Baffle, 181—Band-Shaped Part of Second Member, 182—One Side of First Member, 184—Other Side of First Member, 186—Sewing Part, 188, 189—Vent Holes, 190—One Side of Second Member, 192—Other Side of Second Member, 194, 195—Vent Holes, 196—Apex of Baffle, 200—Side Airbag Device of Second Embodiment, 202—Cushion, 204—Baffle, 206—First Tether, 208—Second Tether, 210—Edge at Vehicle Outer Side of Baffle, 212—Edge at Vehicle Inner Side of Baffle, 214—Sewing Part, 216—Sewing Part, 218, 220—Vent holes, 222—Cutting Line, 224—Sewing Part, 226—Fold of Baffle, 240—Cushion of Variation of Second embodiment, 242—Baffle, 243—Band-Shaped part of Baffle, 244—First Tether, 246—Second Tether, 248—Edge at Vehicle Outer Side of Baffle, and 250—Edge at Vehicle Inner Side of Baffle.

MODE FOR CARRYING OUT THE INVENTION

Preferred embodiments of the present invention will be explained in detail with reference to the attached drawings below. The dimensions, materials, other concrete numerical values, and other that are disclosed in the embodiments are merely examples for facilitating understanding of the invention, and unless otherwise stated, they are not limit the present invention. Further, in the specification and the drawings, with respect to the elements having substantially the same functions and configurations, redundant explanations are omitted by accompanying the same reference numerals. Further, the elements that are not directly related to the present invention are not shown in the drawings.

FIG. 1 is a diagram that exemplarily shows a side airbag device 100 according to a first embodiment of the present invention. FIG. 1A exemplarily shows the side airbag device 100 and a seat 102 that is located on the left side of a vehicle and in which the side airbag device 100 is utilized when viewed from an outer side (a vehicle outer side) in a vehicle width direction. With respect to FIG. 1A and all other diagrams according to the present application, the vehicle front and rear (longitudinal) direction denotes the arrows F (Forward) and B (Back), the vehicle width (crosswise) direction that corresponds to the left and right respectively denotes the arrows L (Left) and R (Right), and the vehicle vertical (up and down) direction denotes the arrows U (Up) and D (Down).

FIG. 1A exemplarily shows an airbag cushion (a cushion 104) after the cushion is expanded and deployed. The cushion 104 is a part by which an occupant is received upon an emergency event such as an occurrence of an impact to the vehicle and is expanded and deployed in a flat shape toward a side (for instance, a gap with a side door) of the occupant that sits on the seat 102. The cushion 104 is formed in a bag shape by combining an outer panel 106 (refer to, for instance, FIG. 2A) that is a base cloth and located at an outer side in the vehicle width direction and an inner panel 108 that is a base cloth and located at an inner side in the vehicle width direction.

The cushion 104 is stored, for instance, in a housing (not shown) that is provided at a side portion of a seatback 110 by being wound or folded. Because the cushion 104 being in a stored state is covered with such as a seat cover thereon, the cushion 104 is not visible from the outside. Further, during the operation, the cushion 104 is expanded and deployed toward the side of the occupant while cleaving the seat cover and so on. The cushion 104 can be provided at another place in which the expansion and deployment can be performed toward the side of the occupant being seated on the seat 102, such as an inside of a side door trim except for the seatback 110.

In the present embodiment, the inside of the cushion 104 is partitioned into three chambers. As shown in FIG. 1A, the cushion 104 has a rear chamber 112 being located at a vehicle rear side, a front chamber 114 being located at a vehicle front side, and a lower chamber 116 being located at a vehicle downward side.

Figure 1B:
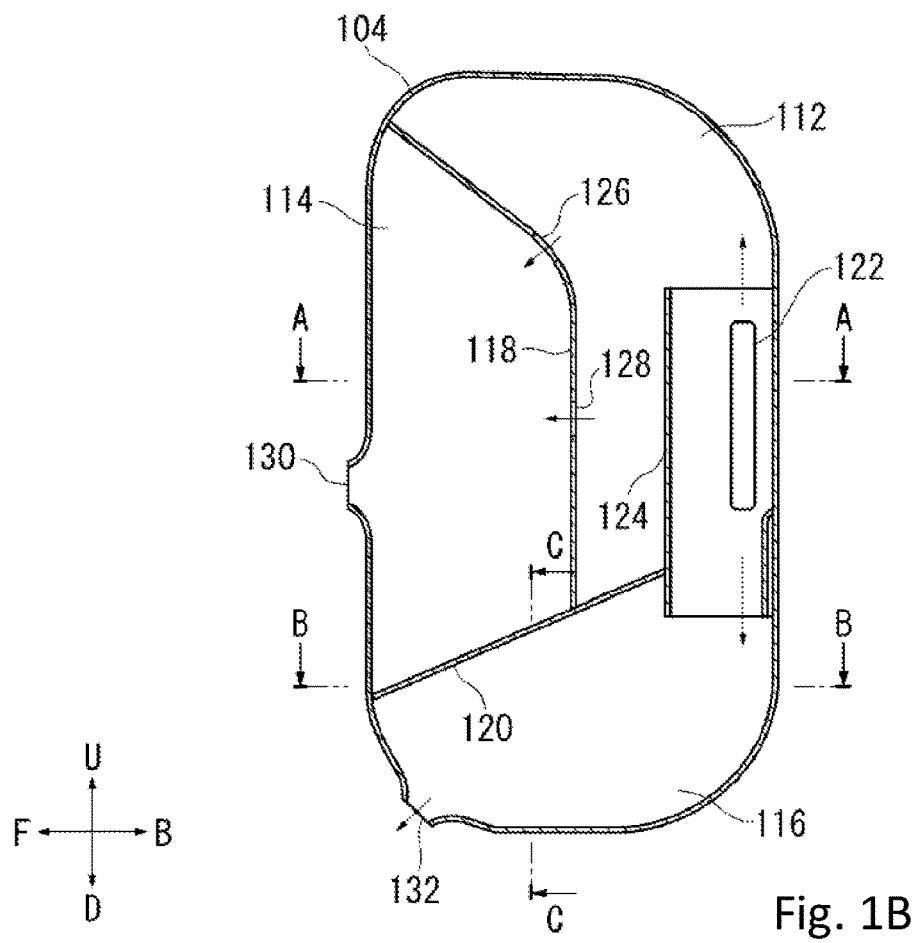

FIG. 1B is a schematic view of an internal structure of the cushion 104 shown in FIG. 1A. With respect to the shape, the rear chamber 112 extends along the seatback 110 (refer to FIG. 1A) in a vertical (up and down) direction, and therefrom, the upper part extends toward the vehicle front side. The rear chamber 112 mainly restrains an upper body of the occupant in which a part near the shoulder is a center thereof. The lower chamber 116 is provided from the bottom of the rear chamber 112 to the vehicle front side and mainly restrains near the waist of the occupant. The front chamber 114 is provided between the rear chamber 112 and lower chamber 116 and widely restrains the occupant.

In the inside of the cushion 104, a baffle 118 that partitions between the rear chamber 112 and the front chamber 114 and a lower baffle 120 that partitions the lower chamber 116 from the rear chamber 112 and the front chamber 114 that are located upward are provided.

FIG. 2 is a schematic cross-sectional view of the cushion 104 shown in FIG. 1B. The cross-sectional views of the cushion 104 being exemplarily shown in FIG. 2 are virtual states in which the cushion 104 is not installed into the seat 102 (refer to FIG. 1A). The cross-sectional views of the cushion 104 in the state in which the cushion 104 is actually installed into the seat 102 become in an asymmetrical state in the vehicle width direction and in a flat state as compared with the state being exemplarily shown in FIG. 2.

FIG. 2A is a cross-sectional view along the A-A line of the rear chamber 112 and the front chamber 114 shown in FIG. 1B. As exemplarily shown in FIG. 2A, the baffle 118 is a wall-like portion that is formed by utilizing such as the same kind of the base cloth as the outer panel 106 and is connected to the outer panel 106 and the inner panel 108 that form an outer surface of the cushion 104 by spanning therebetween in the vehicle width direction.

FIG. 2C is a cross-sectional view along the C-C line of the lower chamber 116 shown in FIG. 1B. As exemplarily shown in FIG. 2C, in the same manner as the baffle 118, the lower baffle 120 is also a wall-like portion that is formed by utilizing such as the base cloth and is connected to the outer panel 106 and the inner panel 108 by spanning therebetween in the vehicle width direction.

Refer to FIG. 1B again. An inflator 122 that is a gas generator is disposed inside the rear chamber 112. The inflator 122 operates by receiving an operation signal that is transmitted from the vehicle side at the occurrence of the impact so as to supply the gas to an inside the cushion 104. The inflator 122 that is adopted in the present embodiment is a cylinder type (a cylindrical type) and is installed at a vehicle rear side of the inside of the rear chamber 112 in a state in which the longitudinal direction of the inflator 122 aligns with the vertical direction. A stud bolt (not shown) extends from the inflator 122 toward the seatback 110 (refer to FIG. 1A) by penetrating through the cushion 104 and is fastened to, for instance, the housing explained above. The cushion 104 is installed into the seat 102 mainly by being supported by the stud bolt of the inflator 122.

There are some kinds of the inflators 122 that are spread through the market at the present time, such as a model in which a gas generating agent is filled and a gas is generated by burning the gas generating agent, a model in which a compressed gas is filled and a gas is supplied without generating heat, and a hybrid model in which a combustion gas and a compressed gas are used. Any kinds of the inflators can be utilized as the inflator 122.

An inner tube 124 that is in a tubular shape and extends in the vehicle vertical direction is provided around the inflator 122. The inner tube 124 is a portion for rectifying the gas from the inflator 122 and is provided from the rear chamber 112 to the lower chamber 116 by penetrating through the lower baffle 120 in the vehicle vertical direction. The inner tube 124 guides the gas from the inflator 122 in each of the vehicle up and down directions and supplies the gas to the rear chamber 112 and the lower chamber 116.

Vent holes 126 and 128 are provided in the baffle 118. The vent holes 126 and 128 are gas flow ports and passes the gas from the side of the rear chamber 112 to the side of the front chamber 114. The cushion 104 also has outer vents 130 and 132 that discharge the gas to the outside. The gas that is flowed into the front chamber 114 is discharged from the outer vent 130 at the upper side and the gas that is flowed into the lower chamber 116 is discharged from the outer vent 132 at the lower side.

Refer to FIG. 2A again. In the present embodiment, a first tether 134 and a second tether 136 as a plurality of tethers are provided at the baffle 118. The first tether 134 and the second tether 136 are portions that are configured with, for instance, the same kind of the base cloth of the baffle 118 and extend from the baffle 118 toward the vehicle rear so as to be connected to a rear end 138 of the cushion 104. The first tether 134 and the second tether 136 are tensed in the vehicle longitudinal direction between the baffle 118 and the rear end 138 of the cushion 104 and pulls the baffle 118 toward the vehicle rear. As a result, since the spread in the shape of the rear chamber 112 in the vehicle longitudinal direction is limited, the rear chamber 112 is rapidly and thickly expanded in the vehicle width direction so that the occupant can be restrained at the early stage.

FIG. 2B is a cross-sectional view along the B-B line near the lower chamber 116 shown in FIG. 1B. Because the lower chamber 116 does not have the portion that corresponds to the baffle 118 and the tether, the lower chamber 116 is expanded in the vehicle longitudinal direction along the shapes of the outer panel 106 and the inner panel 108. As compared with the lower chamber 116 shown in FIG. 2B, the shape of the rear chamber 112 shown in FIG. 2A is limited in the vehicle longitudinal direction by the first tether 134 and the second tether 136.

Figure 3:
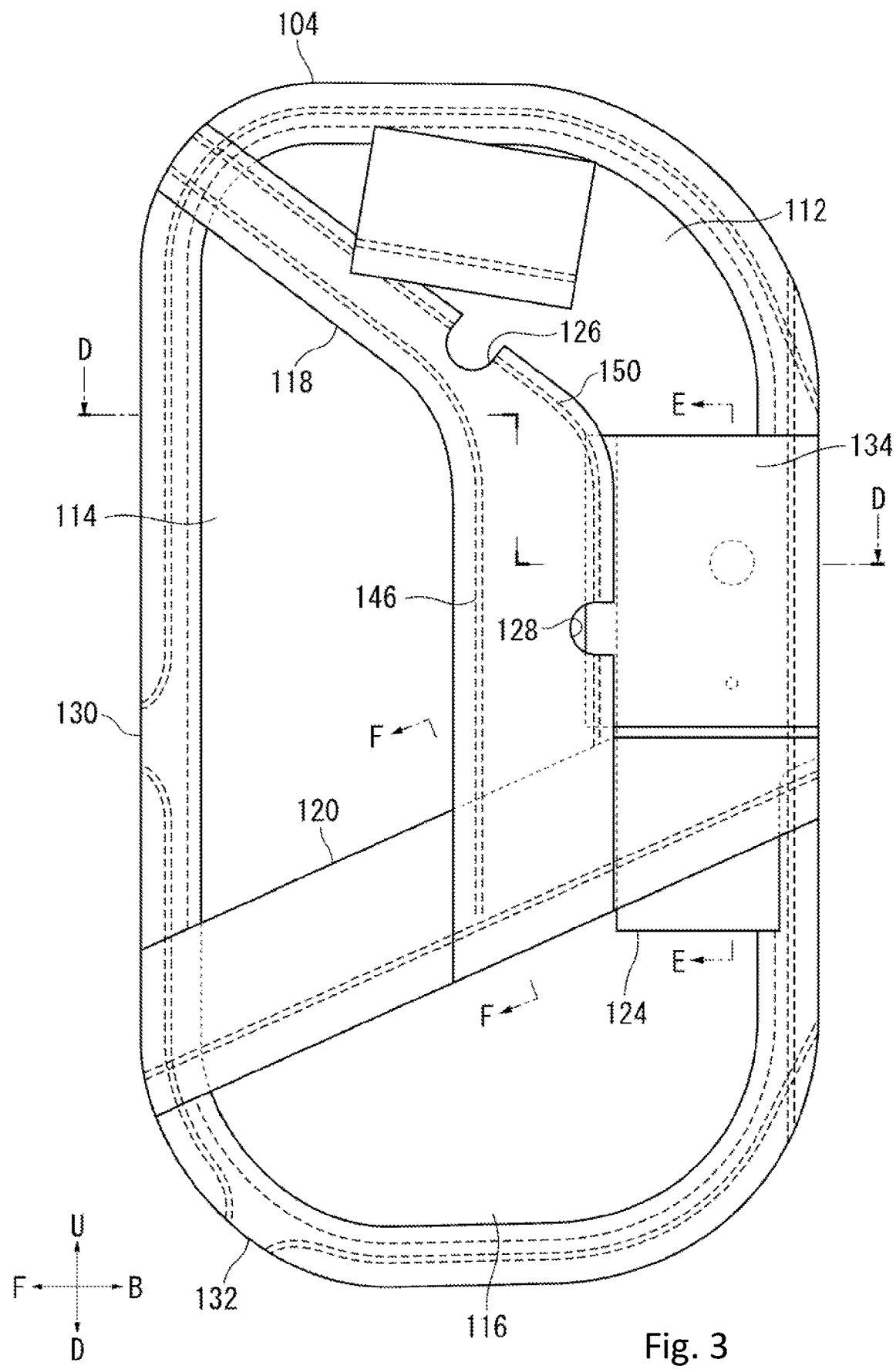
FIG. 3 is a detailed view of an internal configuration of a cushion shown in FIG. 1A.

FIG. 3 is a detailed view of an internal configuration of the cushion 104 shown in FIG. 1A and a diagram that corresponds to FIG. 1B. FIG. 3 exemplarily shows a state of the inside of the cushion 104 by spreading the cushion 104 prior to the expansion and deployment and by omitting the outer panel 106 that is located closer to the viewer of FIG. 3. The configuration of the cushion 104 will be further explained by focusing on the baffle 118 and the tethers (the first tether 134 and the second tether 136) below.

With respect to the baffle 118, the shape is close to the shape in which the Japanese letter "く" (ku) is horizontally inverted when viewed in the vehicle width direction. The top portion of the baffle 118 upwardly extends toward the vehicle front side and the bottom portion of the baffle 118 downwardly extends toward the vehicle lower side. The first tether 134 is connected to the vehicle rear side of the baffle 118 and extends from the baffle 118 toward the vehicle rear (the second tether 136 is in the same manner).

Figure 4A:
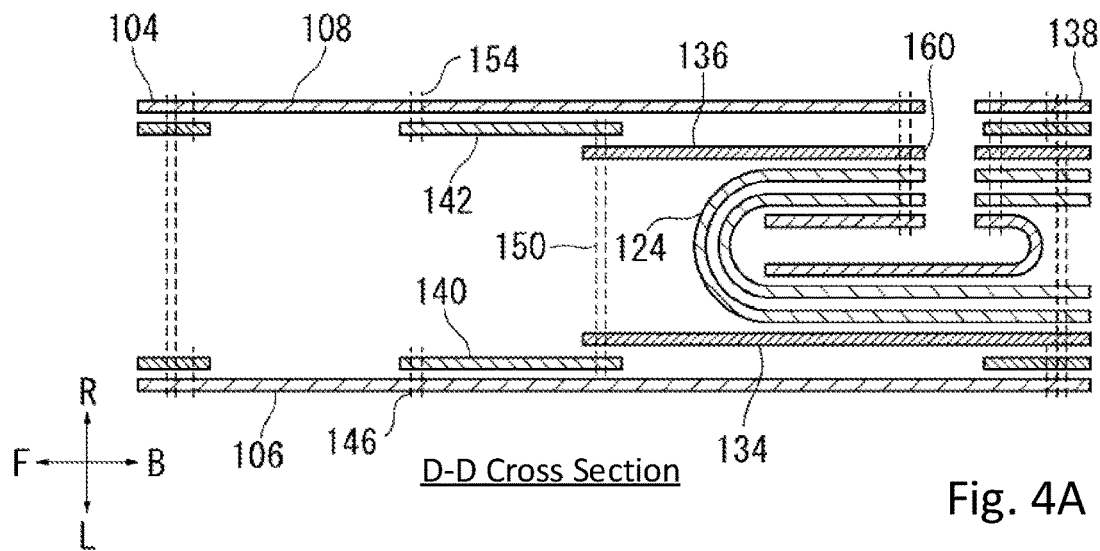
FIGS. 4A, 4B, and 4C are cross-sectional views of the cushion shown in FIG. 3.

FIG. 4 is a cross-sectional view of the cushion 104 shown in FIG. 3. FIG. 4A is a cross-sectional view along the D-D line of the cushion 104 shown in FIG. 3. As exemplarily shown in FIG. 4A, the baffle 118 is configured by including a first member 140 and a second member 142 that are independently provided as cloth materials. The first tether 134 and the second tether 136 are sewed while being sandwiched by the first member 140 and the second member 142 of the baffle 118 so as to be connected to the baffle 118.

FIG. 5 is a diagram that exemplarily shows the baffle 118 and the tethers shown in, for instance, FIG. 3. FIG. 5A exemplarily shows the first member 140 and the first tether 134 located at the vehicle outer side. The first member 140 is a band-shaped member that forms the baffle 118 and has a substantially longitudinal configuration that is bent at an intermediate portion in the longitudinal direction in the present embodiment. With respect to the first member 140, one side 144 of a longitudinal side of the band-shaped member is connected to the outer panel 106 by sewing (a sewing part 146) and other side 148 of the longitudinal side of the band-shaped member is connected to the second member 142 by sewing (a sewing part 150). Notches that forms the vent holes 126 and 128 are provided at the other side 148.

The first tether 134 is formed in a substantially rectangular shape and is connected to the other side 148 of the first member 140 by having the sewing part 150.

FIG. 5B, which corresponds to FIG. 5A, exemplarily shows the second member 142 (refer to FIG. 4A) and the second tether 136 located at the vehicle inner side. The second member 142 is also a band-shaped member that forms the baffle 118 and has a substantially longitudinal configuration that is bent at an intermediate portion in the longitudinal direction. With respect to the second member 142, one side 152 of a longitudinal side of the band-shaped member is also connected to the inner panel 108 by sewing (a sewing part 154) and other side 156 of the longitudinal side of the band-shaped member is also connected to the first member 140 by the sewing part 150. Notches that forms the vent holes 126 and 128 are also provided at the other side 156 of the second member 142.

The second tether 136 is also formed in a substantially rectangular shape and is connected to the other side 156 of the second member 142 by having the sewing part 150. A hole 160 through which the stud bolt (not shown) of the inflator 122 (refer to FIG. 1B) passes is provided in the second tether 136.

FIG. 5C exemplarily shows a state of the baffle 118 prior to the expansion and deployment of the cushion 104. FIG. 5C substantially corresponds to the cushion 104 exemplarily shown in FIG. 2A. As exemplarily shown in FIG. 5C, the baffle 118 is mountain-fold-shaped as the other sides 148 and 156 (refer to FIGS. 5A and 5B) of the first member 140 and the second member 142 form an apex 162 when viewed from the vehicle rear side prior to the expansion and deployment of the cushion 104. According to this configuration, the baffle 118 can be reduced in size by being suitably folded or wound together with the outer panel 106 and the inner panel 108 without generating an extra wrinkle and so on.

The first tether 134 and the second tether 136 are connected to the apex 162 of the other sides 148 and 156 of the baffle 118 being mountain-fold-shaped. Because the baffle 118 is mountain-fold-shaped when viewed from the vehicle rear side, the apex 162 is closer to the rear end 138 as compared with the connection points (the sewing parts 146 and 154) between the baffle 118 and the outer panel 106 and the inner panel 108. Therefore, because the lengths of the first tether 134 and the second tether 136 are set to certain degrees of lengths that are enough to connect between the apex 162 and the rear end 138, the lengths of the first tether 134 and the second tether 136 are shorter at least than the lengths between the sewing parts 146 and 154 and the rear end 138 as the configuration. When the outer panel 106 and the inner panel 108 are attempted to expand by the gas, the first tether 134 and the second tether 136 can be tensed. According to this configuration, it becomes possible that the baffle 118 is suitably pulled toward the vehicle rear by the first tether 134 and the second tether 136.

Refer to FIG. 4 again. As exemplarily shown in FIG. 4A, the first tether 134 and the second tether 136 extend from the baffle 118 via both sides of the inflator 122 in the vehicle width direction, i.e., via both sides of the inner tube 124 in the vehicle width direction, so as to be connected with the rear end 138 of the cushion 104. The inner tube 124 is a portion that receives the gas from the inflator 122 first and is expanded and deployed in a cylindrical shape by the gas. As a result, the force for separating each other in the vehicle width direction is added to the first tether 134 and the second tether 136 by the pressure from the inner tube 124. By utilizing this force, the first tether 134 and the second tether 136 can also suitably pull the baffle 118 toward the vehicle rear.

Figure 4B:
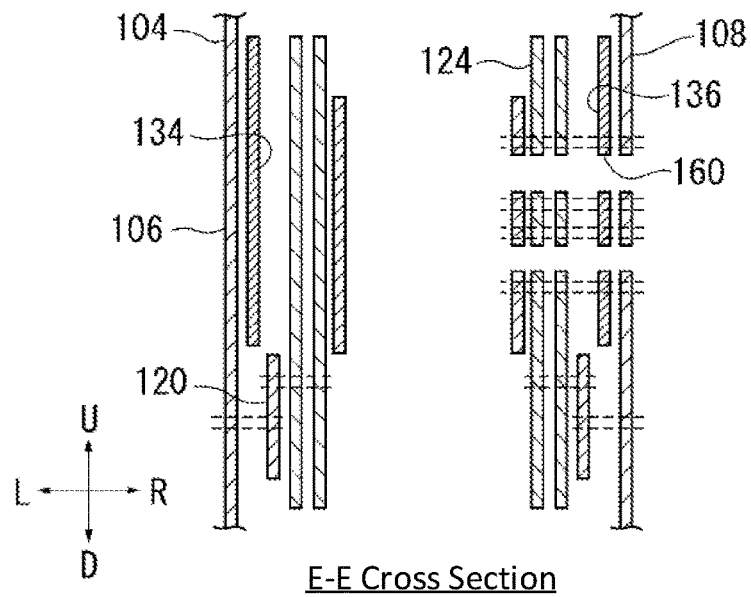

FIG. 4B is a cross-sectional view along the E-E line of the cushion 104 shown in FIG. 3. As also shown in FIG. 4B, it can be seen that the first tether 134 and the second tether 136 extend via both sides of the inner tube 124 in the vehicle width direction, i.e., between the inner tube 124 and each of the outer panel 106 and the inner panel 108. Because this inner tube 124 is expanded and deployed, the force for separating in the vehicle width direction explained above is added to the first tether 134 and the second tether 136.

Figure 4C:
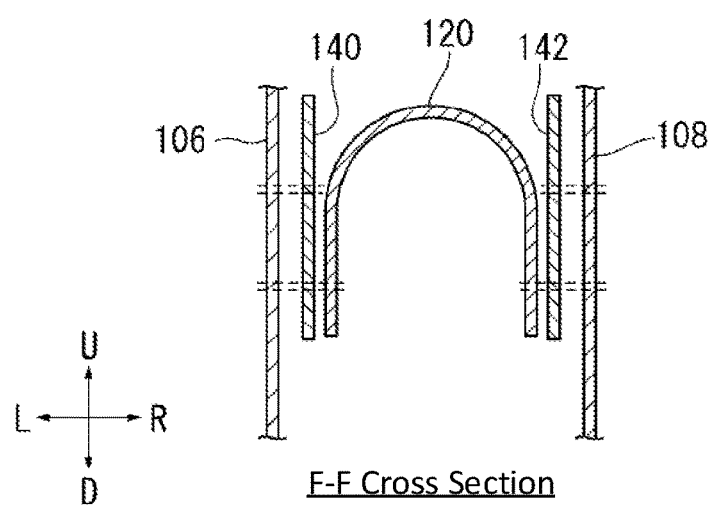

FIG. 4C is a cross-sectional view along the F-F line of the cushion 104 shown in FIG. 3A. As exemplarily shown in FIG. 4C, the lower baffle 120 extends between the first member 140 and the second member 142 at the lower part of the baffle 118 and the first member 140 and the second member 142 are also sewed to the lower baffle 120.

As explained above, according to the present embodiment, when the cushion 104 starts to be expanded, the baffle 118 is pulled toward the vehicle rear side by the first tether 134 and the second tether 136. Thus, because the spread of the rear chamber 112 in the vehicle longitudinal direction is limited, the rear chamber 112 rapidly becomes thick in the vehicle width direction. As a result, the rear chamber 112 is hardly recessed even when the load in the vehicle width direction is received. Because the rear chamber 112 is located close to the occupant and because the gas is flowed into the rear chamber 112 prior to the front chamber 114, according to the present embodiment, the occupant can be restrained by high restraint force by the rear chamber 112 being thick in the vehicle width direction at an early stage after the impact is detected.

With respect to the cushion 104 according to the present embodiment, for instance, it is also possible to reduce the injuriousness to the occupant who is positioned in an unexpected posture (commonly known as Out Of Position (OOP)) other than a normal seated state. For instance, in the state shown in FIG. 1A, when the occupant is positioned close to the vehicle outer side of the seat 102, it means that the occupant is located at the vehicle front side of the cushion 104 and there is a possibility that the cushion 104 linearly comes in contact with the occupant from the vehicle rear side. However, in the present embodiment, the entire shape of the cushion 104 in the vehicle longitudinal direction is also limited because the rear chamber 112 does not spread in the vehicle longitudinal direction. As a result, according to the present embodiment, even when the cushion 104 linearly comes in contact with the occupant who is located at the non-normal position, the input load that can be given to the occupant can be suppressed.

Variation of First Embodiment

Figure 6:
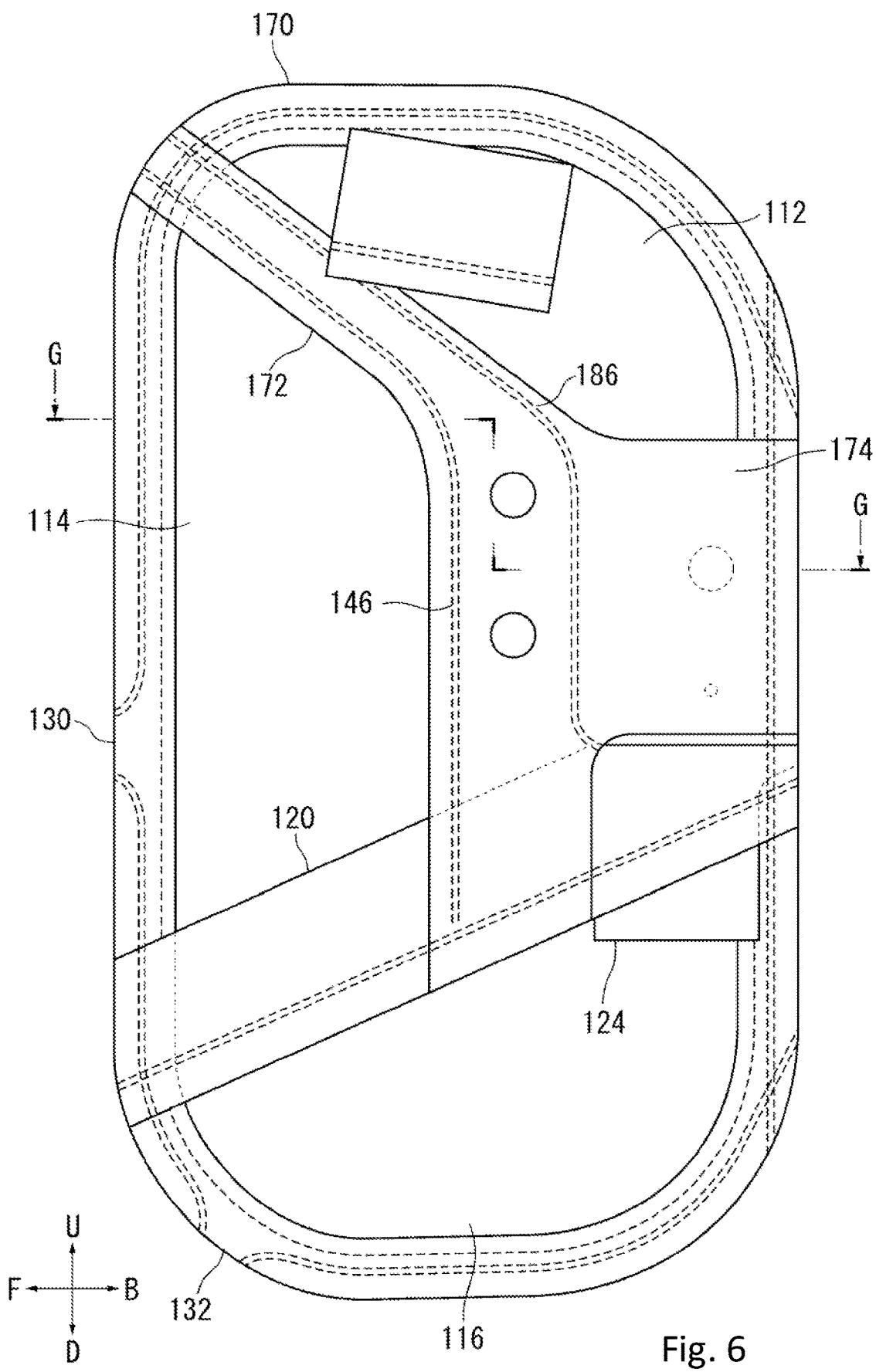
FIG. 6 is a diagram that exemplarily shows a variation of the cushion shown in FIG. 3.

FIG. 6 is a diagram that exemplarily shows a variation of the cushion 104 shown in FIG. 3. In the following descriptions, with respect to the elements that are already explained, the explanations thereof are omitted by accompanying the same reference numerals. Further, when the following elements have different reference numerals but have the same names as the elements that are already explained, such elements have the same functions unless otherwise stated.

In the same manner as the FIG. 3, FIG. 6 also exemplarily shows a state of the inside by spreading a cushion 170 of the variation prior to the expansion and deployment and by omitting the outer panel 106 that is located closer to the viewer of FIG. 6. In the almost same manner as the cushion 104 shown in FIG. 3, the cushion 170 has a baffle 172 and tethers (a first tether 174 and a second tether 176 (refer to FIG. 7)), however, the cushion 170, in which the baffle 172 and the tethers are integrally formed, is different from the cushion 104 with respect to their configurations.

Figure 7:
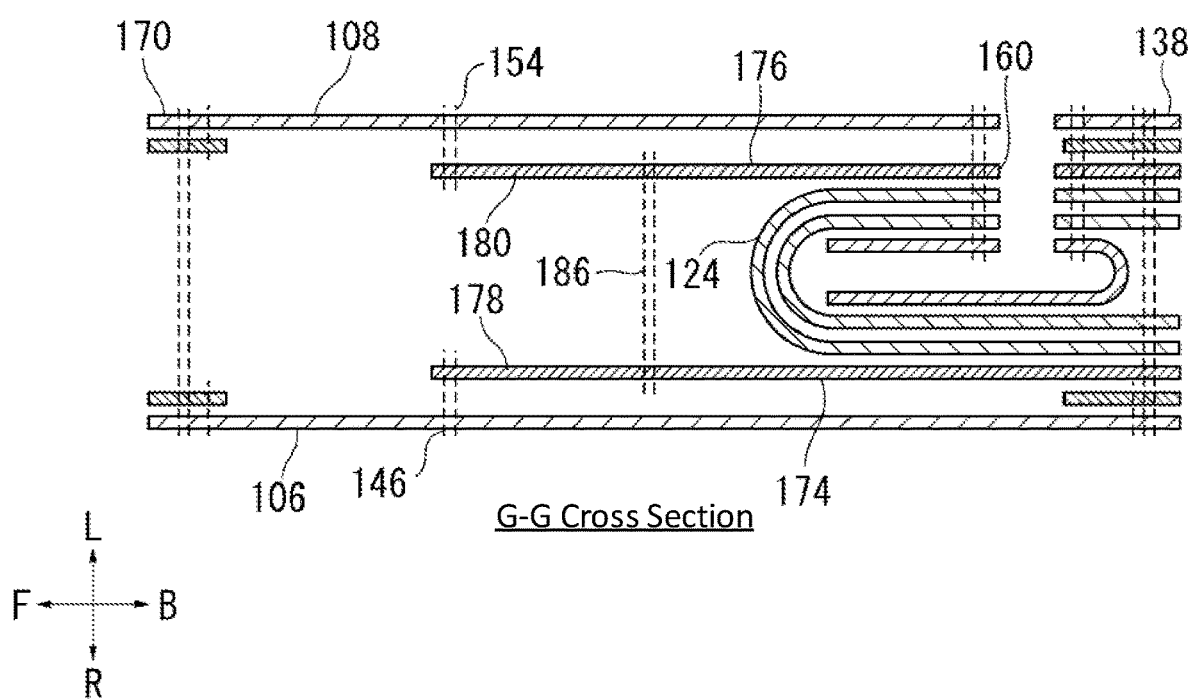
FIG. 7 is a cross-sectional view along the G-G line of the cushion shown in FIG. 6.

FIG. 7 is a cross-sectional view along the G-G line of the cushion 170 shown in FIG. 6. As exemplarily shown in FIG. 7, the baffle 172 is also configured by including a first member 178 and a second member 180 that are independently provided as cloth materials. Further, the first tether 174 is integrally provided with the first member 178 and the second tether 176 is integrally provided with the second member 180. The first tether 174 and the second tether 176 also extend via both sides of the inner tube 124 in the vehicle width direction so as to be connected with the rear end 138 of the cushion 170.

Figure 8A:
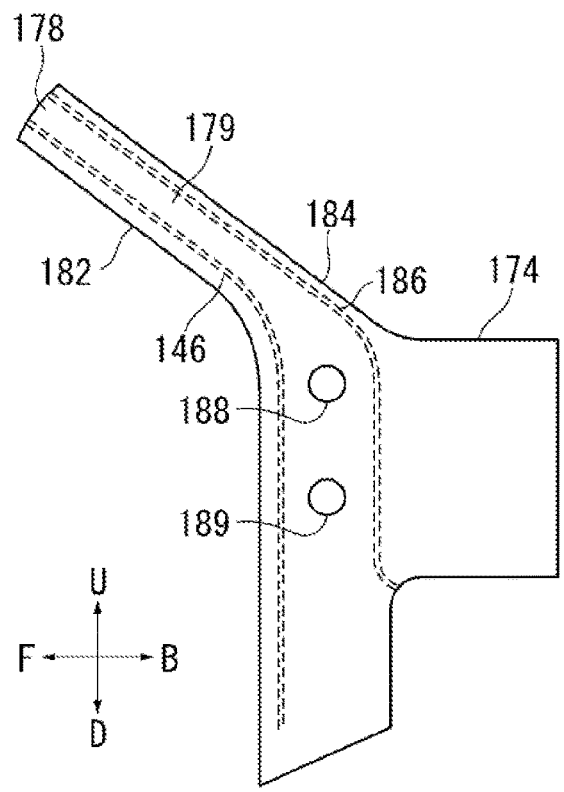
FIGS. 8A, 8B, and 8C are diagrams that exemplarily show the baffle and the tethers shown in, for instance, FIG. 6.

FIG. 8 is a diagram that exemplarily shows the baffle 172 and the tethers shown in, for instance, FIG. 6. FIG. 8A exemplarily shows the first member 178 and the first tether 174 located at the vehicle outer side. With respect to the first member 178, a band-shaped part 179 and the first tether 174 in a rectangular shape are integrally formed. The band-shaped part 179 is a longitudinal region that is bent at the intermediate portion in the longitudinal direction of the first member 178. One side 182 of the longitudinal side of the band-shaped part 179 is connected to the outer panel 106 by the sewing part 146 and other side 184 of the longitudinal side of the band-shaped part 179 is connected to the second member 180 by a sewing part 186. Vent holes 188 and 189 that distribute the gas from the rear chamber 112 to the front chamber 114 are suitably provided in the first member 178.

The first tether 174 continuously extends in the rectangular shape manner from the other side 184 of the band-shaped part 179 of the first member 178.

Figure 8B:
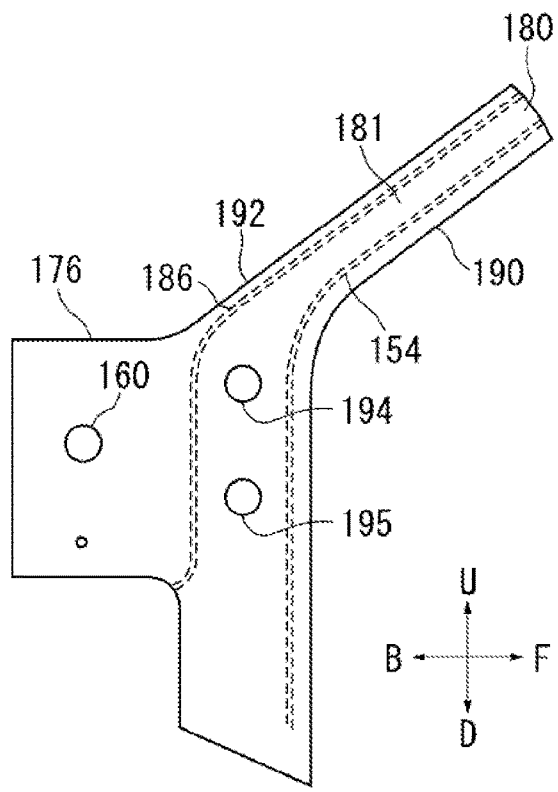

FIG. 8B, which corresponds to FIG. 8A, exemplarily shows the second member 180 (refer to FIG. 7) and the second tether 176 located at the vehicle inner side. With respect to the second member 180, a band-shaped part 181 and the second tether 176 in a rectangular shape are integrally formed. The band-shaped part 181 is the longitudinal region that is bent at the intermediate portion in the longitudinal direction of the second member 180. One side 190 of the longitudinal side of the band-shaped part 181 is connected to the inner panel 108 by the sewing part 154 and other side 192 of the longitudinal side of the band-shaped part 181 is connected to the first member 178 by the sewing part 186. Vent holes 194 and 195 that distribute the gas from the rear chamber 112 to the front chamber 114 are also suitably provided in the second member 180.

The second tether 176 is also formed in a substantially rectangular shape and continuously extends in the rectangular shape manner from the other side 192 of the band-shaped part 181 of the second member 180. The hole 160 through which the stud bolt (not shown) of the inflator 122 (refer to FIG. 1B) passes is provided in the second tether 176.

Figure 8C:
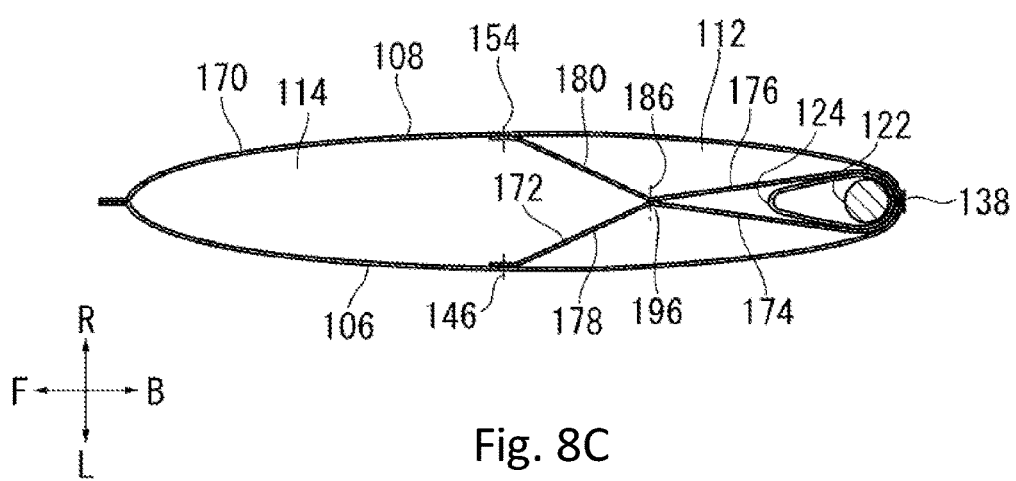

FIG. 8C, which corresponds to FIG. 5C, exemplarily shows a state of the baffle 172 prior to the expansion and deployment of the cushion 170. As exemplarily shown in FIG. 8C, the baffle 172 is mountain-fold-shaped as the other side 184 of the band-shaped part 179 (refer to FIG. 8A) of the first member 178 and the other side 192 of the band-shaped part 181 of the second member 180 form an apex 196 when viewed from the vehicle rear side prior to the expansion and deployment of the cushion 170. According to this configuration, the baffle 172 can be reduced in size by being suitably folded or wound together with the outer panel 106 and the inner panel 108 without generating an extra wrinkle and so on.

The first tether 174 and the second tether 176 continuously extend from the apex 196 of the baffle 172 being mountain-fold-shaped toward the vehicle rear as parts of the baffle 172. Because the baffle 172 is mountain-fold-shaped when viewed from the vehicle rear side, the apex 196 is closer to the rear end 138 as compared with the connection points (the sewing parts 146 and 154) between the baffle 172 and the outer panel 106 and the inner panel 108. Therefore, because the lengths of the first tether 174 and the second tether 176 are set to certain degrees of lengths that are enough to connect between the apex 196 and the rear end 138, the lengths of the first tether 174 and the second tether 176 are shorter at least than the lengths between the sewing parts 146 and 154 and the rear end 138 as the configuration. When the outer panel 106 and the inner panel 108 are attempted to expand by the gas, the first tether 174 and the second tether 176 can be tensed. According to this configuration, it becomes possible that the baffle 172 is suitably pulled to the vehicle rear by the first tether 174 and the second tether 176.

When the cushion 170 explained above starts to be expanded, the baffle 172 is pulled toward the vehicle rear side by the first tether 174 and the second tether 176. Thus, because the spread of the rear chamber 112 in the vehicle longitudinal direction is limited, the rear chamber 112 rapidly becomes thick in the vehicle width direction (refer to FIG. 2A). As a result, the rear chamber 112 is hardly recessed even when the load in the vehicle width direction is received. Because the rear chamber 112 is located close to the occupant and because the gas is flowed into the rear chamber 112 prior to the front chamber 114, according to the cushion 170, the occupant can be restrained by high restraint force by the rear chamber 112 being thick in the vehicle width direction at an early stage after the impact is detected.

Second Embodiment

Figure 9:
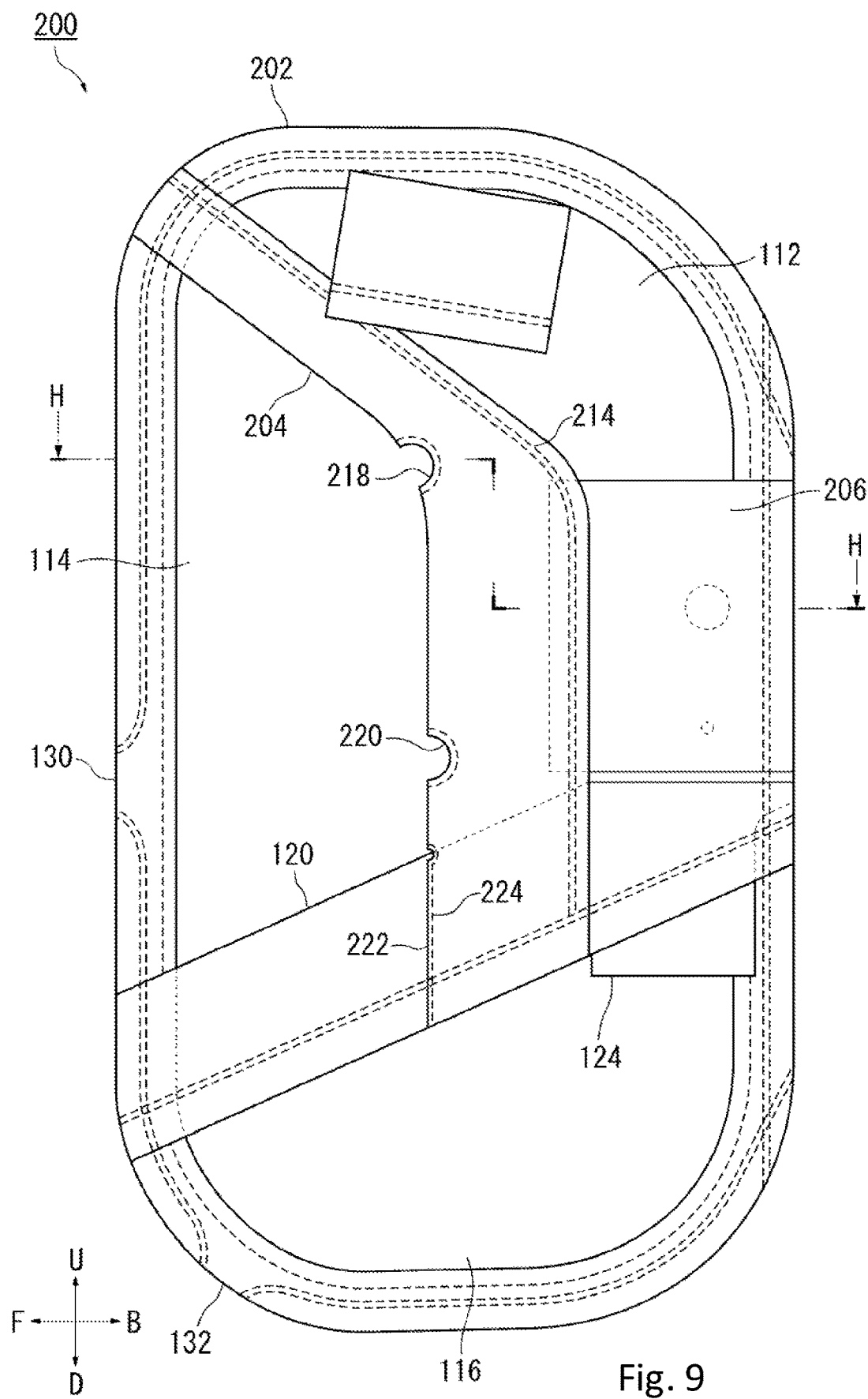
FIG. 9 is a diagram that exemplarily shows a side airbag device according to a second embodiment of the present invention.

FIG. 9 is a diagram that exemplarily shows a side airbag device 200 according to a second embodiment of the present invention. In the second embodiment, with respect to the elements that are already explained in the first embodiment, the explanations thereof are omitted by accompanying the same reference numerals. Further, when the following elements have different reference numerals but have the same names as the elements that are already explained in the first embodiment, such elements have the same functions unless otherwise stated.

FIG. 9, which corresponds to the cushion 104 shown in FIG. 3, exemplarily shows a state of the inside of a cushion 202 by spreading the cushion 202 prior to the expansion and deployment and by omitting the outer panel 106 that is located closer to the viewer of FIG. 9. The cushion 202 exemplarily shown in FIG. 9 is different from the cushion 104 of the first embodiment, for instance, shown in FIG. 3 with respect to the configuration in which a baffle 204 is configured with one cloth material.

Figure 10:
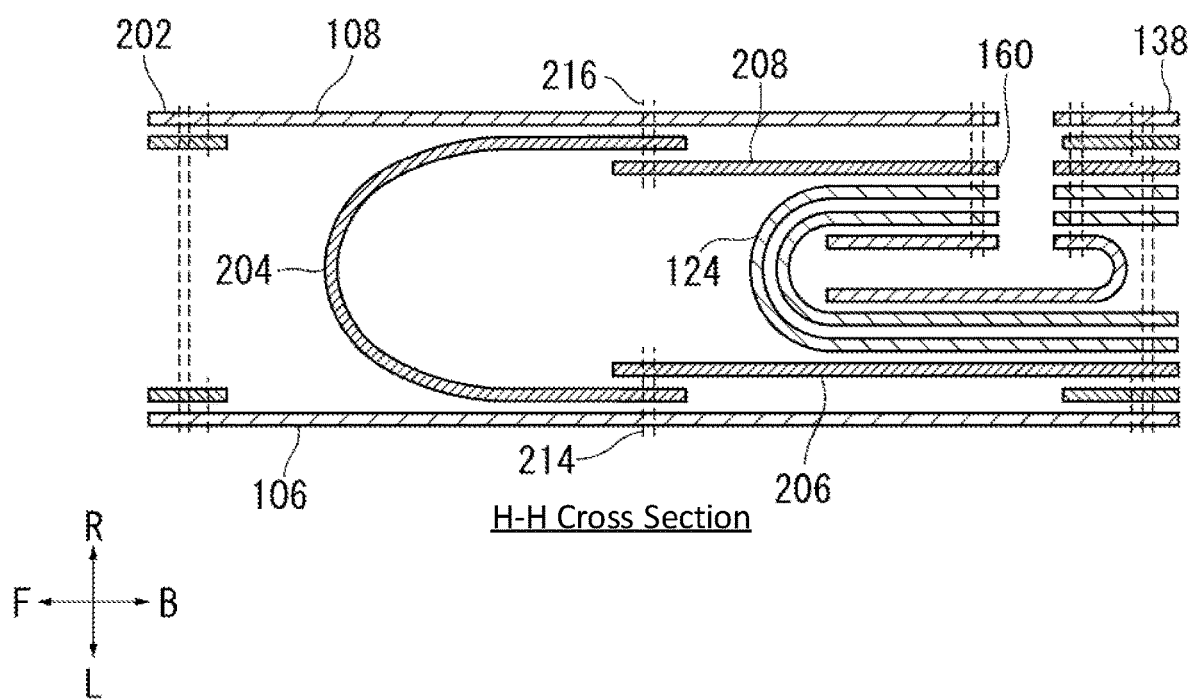
FIG. 10 is a cross-sectional view along the H-H line of the cushion shown in FIG. 9.

FIG. 10 is a cross-sectional view along the H-H line of the cushion 202 shown in FIG. 9. As exemplarily shown in FIG. 9, the baffle 204 is mountain-fold-shaped toward the vehicle front side prior to the expansion and deployment of the cushion 202. A first tether 206 and a second tether 208 are connected to the both sides of the baffle 204 in the vehicle width direction. The first tether 206 and the second tether 208 also extend via both sides of the inner tube 124 in the vehicle width direction so as to be connected with the rear end 138 of the cushion 202.

Figure 11A:
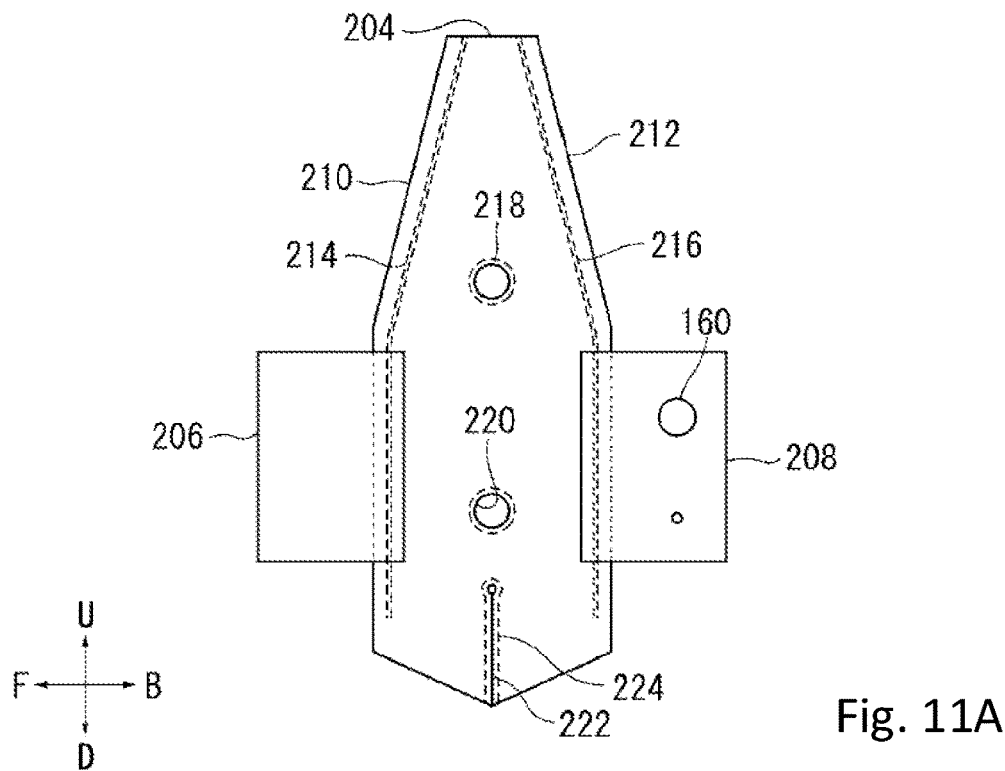
FIGS. 11A, 11B, and 11C are diagrams that exemplarily show each state of the baffle shown in FIG. 10.
Figure 11B:
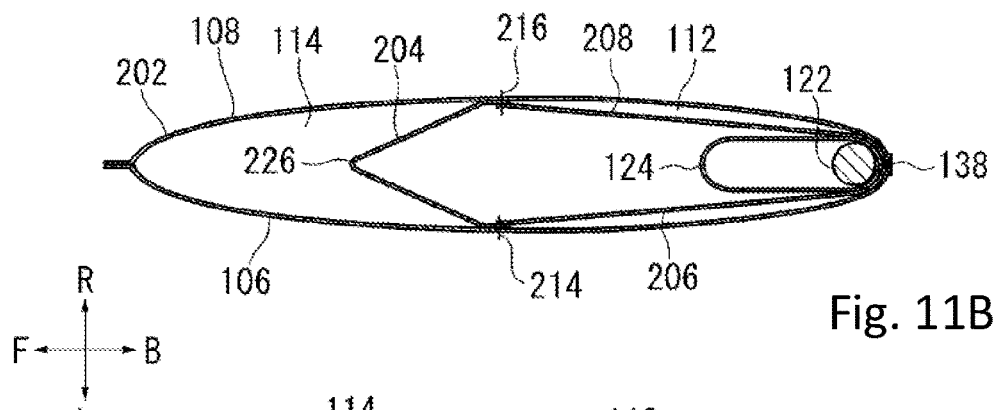
Figure 11C:
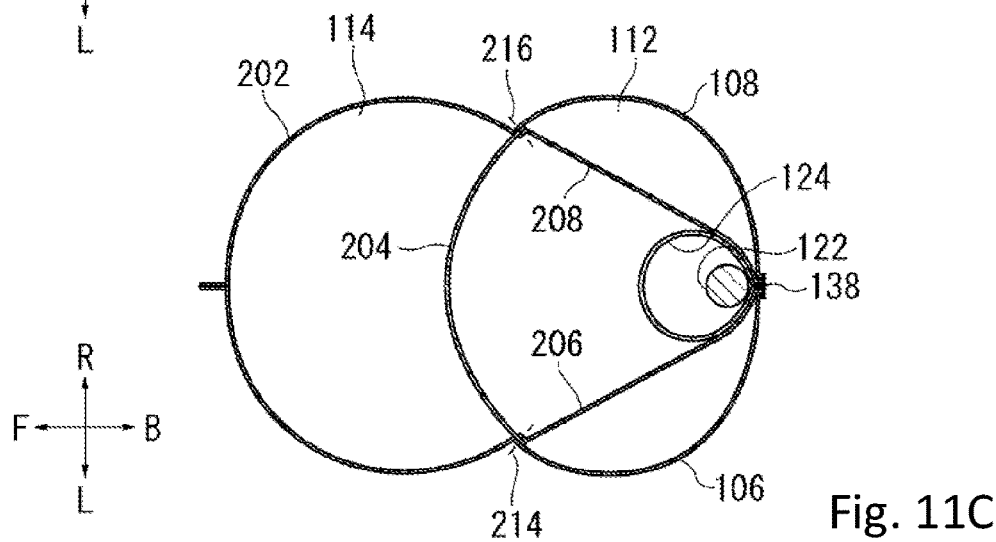

FIG. 11 is a diagram that exemplarily shows each state of the baffle 204 shown in FIG. 10. FIG. 11A is a diagram that exemplarily shows the baffle 204 that is opened, when viewed from the vehicle rear side. As exemplarily shown in FIG. 11, the baffle 204 is a band-shaped member in the longitudinal configuration in which the width gradually increases from the upper edge toward the center and spans between the outer panel 106 and the inner panel 108 in the vehicle width direction by sewing parts 214 and 216 provided along the both edges (an edge 210 at the vehicle outer side and an edge 212 at the vehicle inner side) in the vehicle width direction that correspond to the longitudinal sides of the band-shaped member.

The first tether 206 and the second tether 208 are connected to the edges 210 and 212 of the baffle 204 by the sewing parts 214 and 216. The first tether 206 and the second tether 208 are respectively formed in the substantially rectangular shape. The hole 160 through which the stud bolt (not shown) of the inflator 122 (refer to FIG. 1B) passes is provided in the second tether 208.

Vent holes 218 and 220 that distribute the gas from the rear chamber 112 to the front chamber 114 are suitably provided in the baffle 204. Further, a cutting line 222 through which the lower baffle 120 (refer to FIG. 9) passes is provided at the lower part of the baffle 204. A sewing part 224 that connects with the lower baffle 120 is provided along the cutting line 222.

FIG. 11B exemplarily shows a state of the baffle 204 prior to the expansion and deployment of the cushion 202. The baffle 204 is mountain-fold-shaped with respect to a fold 226 that extends in the vehicle vertical direction when viewed from the vehicle front side prior to the expansion and deployment of the cushion 202. According to this configuration, the baffle 204 can be reduced in size by being suitably folded or wound together with the outer panel 106 and the inner panel 108 without generating an extra wrinkle and so on.

The first tether 206 and the second tether 208 extend from the both edges (the edge 210 and the edge 212) of the baffle 204 in the vehicle width direction toward the vehicle rear and are connected to the rear end 138 of the cushion 202. At this time, the lengths of the first tether 206 and the second tether 208 are set to be shorter than the lengths of the outer panel 106 and the inner panel 108 extending from the sewing parts 214 and 216 that correspond to the connection points between the baffle 204 and the outer panel 106 and the inner panel 108 to the rear end 138 of the cushion 202. When the outer panel 106 and the inner panel 108 are attempted to expand by the gas, the first tether 206 and the second tether 208 that are set to be these lengths can be suitably tensed and pull the baffle 204 toward the vehicle rear.

The first tether 206 and the second tether 208 extend from the edges 210 and 212 of the baffle 204 in the vehicle width direction via both sides of the inflator 122 in the vehicle width direction, i.e., via both sides of the inner tube 124 in the vehicle width direction, so as to be connected with the rear end 138 of the cushion 202. The inner tube 124 is the portion that receives the gas from the inflator 122 first and is expanded and deployed in a cylindrical shape by the gas. As a result, the force for separating each other in the vehicle width direction is added to the first tether 206 and the second tether 208 by the pressure from the inner tube 124. By utilizing this force, the first tether 206 and the second tether 208 can also pull the baffle 204 toward the vehicle rear.

As explained above, according to the present embodiment, when the cushion 202 starts to be expanded, the baffle 204 is pulled toward the vehicle rear side by the first tether 206 and the second tether 208. Thus, because the spread of the rear chamber 112 in the vehicle longitudinal direction is limited, the rear chamber 112 rapidly becomes thick in the vehicle width direction. As a result, the rear chamber 112 is hardly recessed even when the load in the vehicle width direction is received. Because the rear chamber 112 is located close to the occupant and because the gas is flowed into the rear chamber 112 prior to the front chamber 114, according to the present embodiment, the occupant can be restrained by high restraint force by the rear chamber 112 being thick in the vehicle width direction at an early stage after the impact is detected.

Variation of Second Embodiment

Figure 12:
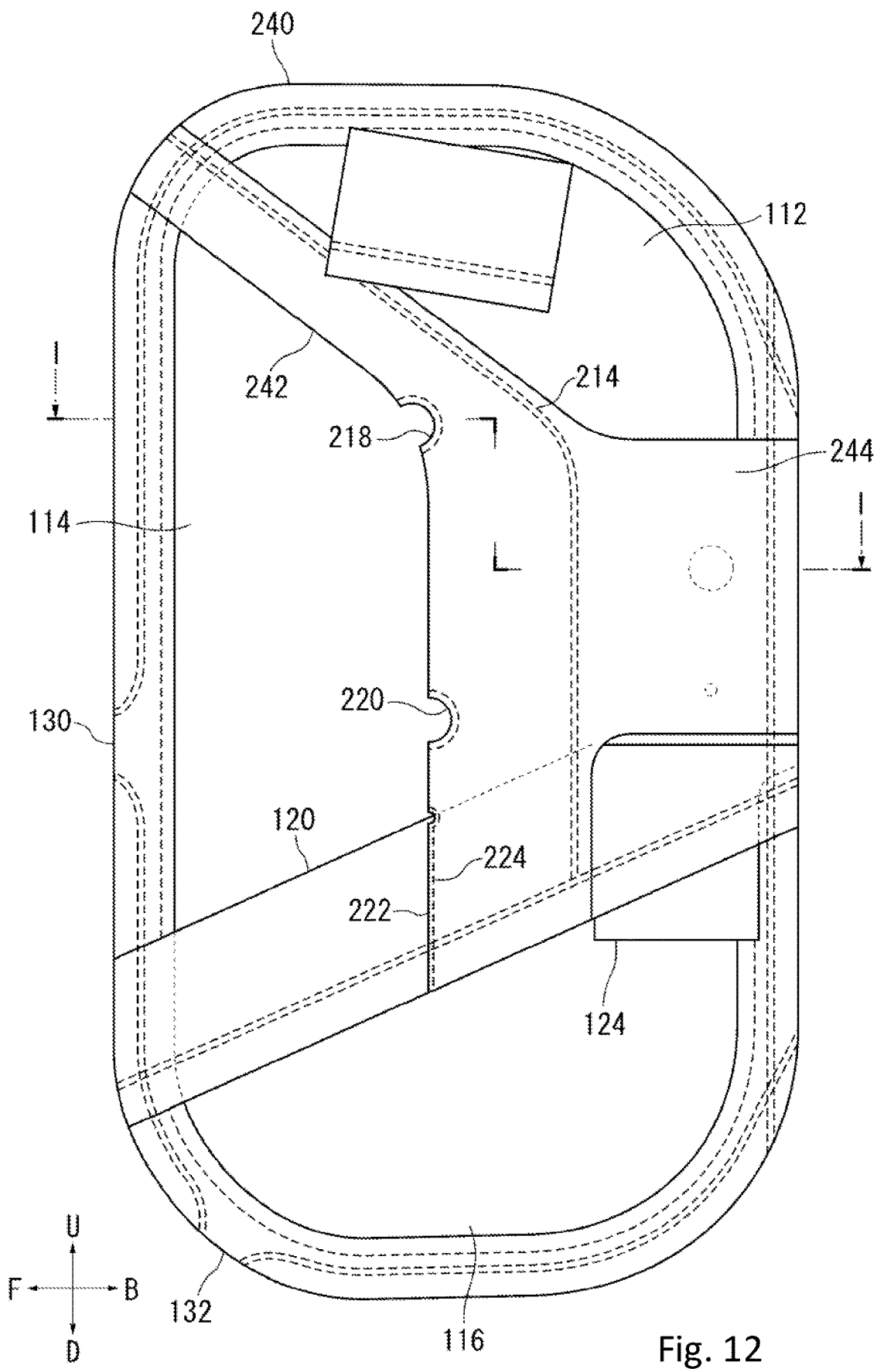
FIG. 12 is a diagram that exemplarily shows a variation of the cushion shown in FIG. 9.

FIG. 12 is a diagram that exemplarily shows a variation of the cushion 202 shown in FIG. 9. In the following descriptions, with respect to the elements that are already explained, the explanations thereof are omitted by accompanying the same reference numerals. Further, when the following elements have different reference numerals but have the same names as the elements that are already explained, such elements have the same functions unless otherwise stated.

In the same manner as the FIG. 9, FIG. 12 also exemplarily shows a state of the inside by spreading a cushion 240 prior to the expansion and deployment and by omitting the outer panel 106 that is located closer to the viewer of FIG. 12. In the same manner as the cushion 202 shown in FIG. 9, the cushion 240 has a baffle 242 and tethers (a first tether 244 and a second tether 246 (refer to FIG. 13)), however, the cushion 240, in which the baffle 242 and the tethers are integrally formed, is different from the cushion 202 with respect to their configurations.

Figure 13:
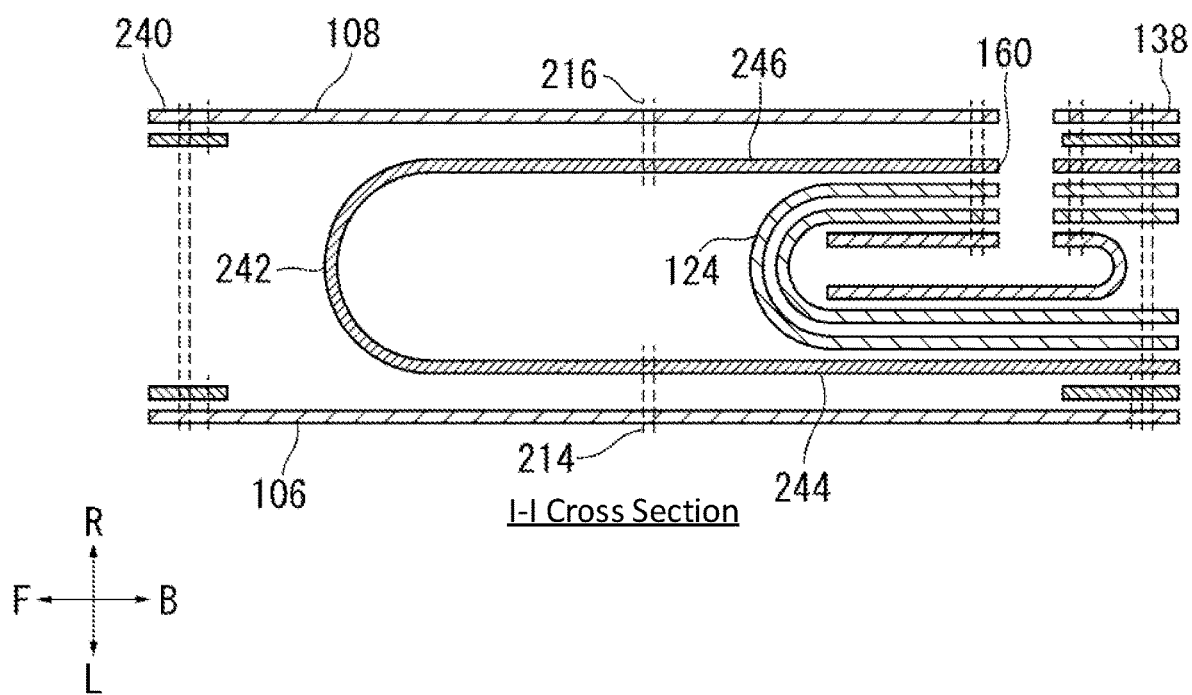
FIG. 13 is a cross-sectional view along the I-I line of the cushion shown in FIG. 12.

FIG. 13 is a cross-sectional view along the I-I line of the cushion 240 shown in FIG. 12. As exemplarily shown in FIG. 13, the baffle 242 is also mountain-fold-shaped when viewed from the vehicle front side prior to the expansion and deployment of the cushion 240. The first tether 244 and the second tether 246 continuously extend from both sides of the baffle 242 in the vehicle width direction toward the vehicle rear. The first tether 244 and the second tether 246 also extend via both sides of the inner tube 124 in the vehicle width direction so as to be connected with the rear end 138 of the cushion 240.

Figure 14A:
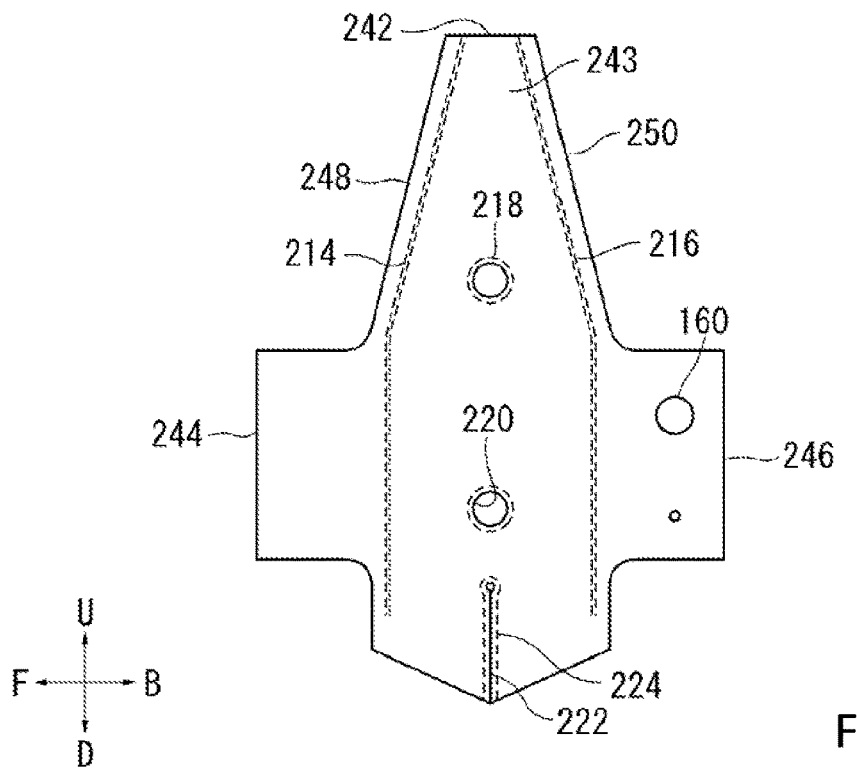
FIGS. 14A, 14B, and 14C are diagrams that exemplarily show each state of the baffle shown in FIG. 12.
Figure 14B:
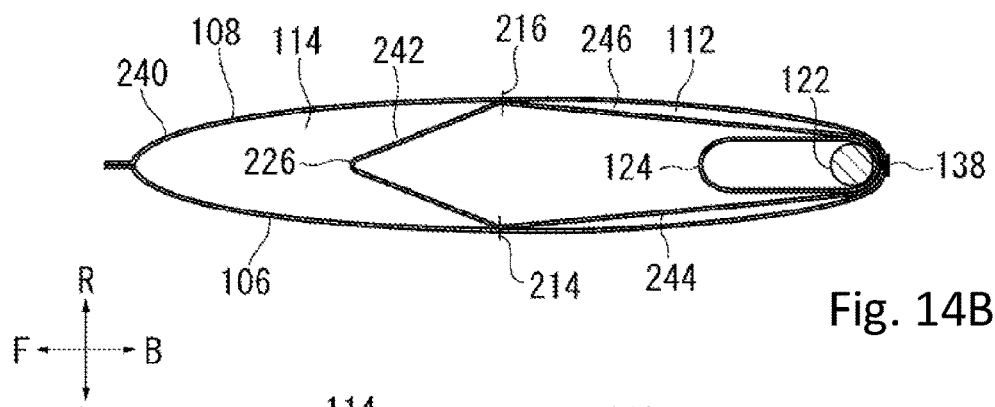
Figure 14C:
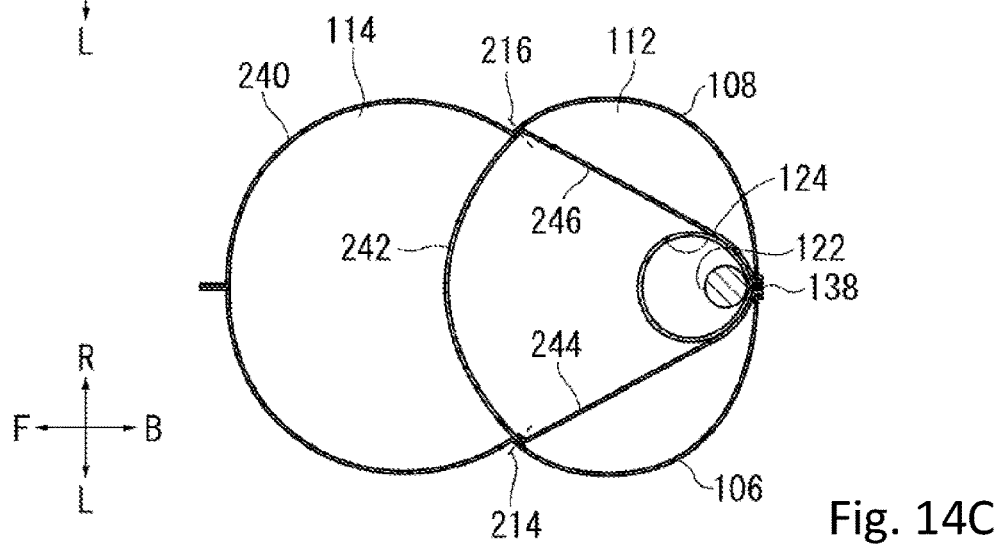

FIG. 14 is a diagram that exemplarily shows each state of the baffle 242 shown in FIG. 12. FIG. 14A is a diagram that exemplarily shows the baffle 242 that is opened, when viewed from the vehicle rear side. As exemplarily shown in FIG. 14, the baffle 242 is a band-shaped member 243 in the longitudinal configuration in which the width gradually increases from the upper edge toward the center and is integrally formed with the first tether 244 and the second tether 246, which are respectively in the rectangular shape, at the both sides of the band-shaped part 243. The band-shaped part 243 spans in the vehicle width direction between the outer panel 106 and the inner panel 108 by the sewing parts 214 and 216 along the both edges (edges 248 and 250) in the vehicle width direction that correspond to the longitudinal sides of the band-shaped member.

At the edges 248 and 250 of the band-shaped part 243 of the baffle 242, the first tether 244 and the second tether 246 are continuously provided as parts of the baffle 242. The first tether 244 and the second tether 246 are respectively in the rectangular shape. The hole 160 through which the stud bolt (not shown) of the inflator 122 (refer to FIG. 1B) passes is provided in the second tether 246.

The vent holes 218 and 220 that distribute the gas from the rear chamber 112 to the front chamber 114 are suitably provided in the baffle 242. Further, a cutting line 222 through which the lower baffle 120 (refer to FIG. 12) passes is provided at the lower part of the baffle 242. A sewing part 224 that connects with the lower baffle 120 is provided along the cutting line 222.

FIG. 14B exemplarily shows a state of the baffle 242 prior to the expansion and deployment of the cushion 240. The baffle 242 is mountain-fold-shaped with respect to a fold 226 that extends in a vehicle vertical direction when viewed from the vehicle front side prior to the expansion and deployment of the cushion 240. According to this configuration, the baffle 242 can be reduced in size by being suitably folded or wound together with the outer panel 106 and the inner panel 108 without generating an extra wrinkle and so on.

The first tether 244 and the second tether 246 continuously extend from the edges 248 and 250 of the baffle 242 in the vehicle width direction toward the vehicle rear and are connected to the rear end 138 of the cushion 240. At this time, the lengths of the first tether 244 and the second tether 246 are set to be shorter than the lengths of the outer panel 106 and the inner panel 108 extending from the sewing parts 214 and 216 that correspond to the connection points between the baffle 242 and the outer panel 106 and the inner panel 108 to the rear end 138 of the cushion 240. When the outer panel 106 and the inner panel 108 are attempted to expand by the gas, the first tether 244 and the second tether 246 that are set to be these lengths can be suitably tensed and pull the baffle 242 toward the vehicle rear.

The first tether 244 and the second tether 246 extend from the edges 248 and 250 of the baffle 242 in the vehicle width direction via both sides of the inflator 122 in the vehicle width direction, i.e., via both sides of the inner tube 124 in the vehicle width direction, so as to be connected with the rear end 138 of the cushion 240. The inner tube 124 is the portion that receives the gas from the inflator 122 first and is expanded and deployed in a cylindrical shape by the gas. As a result, the force for separating each other in the vehicle width direction is added to the first tether 244 and the second tether 246 by the pressure from the inner tube 124. By utilizing this force, the first tether 244 and the second tether 246 can pull the baffle 242 toward the vehicle rear.

As explained above, when the cushion 240 starts to be expanded, the baffle 242 is pulled toward the vehicle rear side by the first tether 244 and the second tether 246. Thus, because the spread of the rear chamber 112 in the vehicle longitudinal direction is limited, the rear chamber 112 rapidly becomes thick in the vehicle width direction. As a result, rear chamber 112 is hardly being recessed even when the load in the vehicle width direction is received. Because the rear chamber 112 is located close to the occupant and because the gas is flowed into the rear chamber 112 prior to the front chamber 114, according to the cushion 240, the occupant can be restrained by high restraint force by the rear chamber 112 being thick in the vehicle width direction at an early stage after the impact is detected.

Further, in the first and second embodiments explained above, although two tethers in total, the first and second tethers, are provided as a plurality of tethers, the number of the tethers may be at least equal to or more than two. For instance, with respect to the cushion 104 according to the first embodiment, two tethers located at the upper and lower sides instead of the first tether 134 can also be provided and the second tether 176 can be replaced by two tethers, the upper and lower tethers. As a result, it is possible that the four tethers can be provided and substituted.

Although the preferred embodiments of the present invention have been described with reference to the attached drawings, the present invention is not limited to these embodiments. It will be apparent to one of ordinary skill in the art to conceive various modifications within the scope of the claims. All such modifications are intended to be included within the technical scope of the present invention. For instance, in the embodiments explained above, the configuration in which two overlap vents are provided is adopted. However, if it is possible to meet the required performance, the configuration in which only one is provided may be adopted, and further, the configuration in which three or more are provided may also be adopted. In addition, although the sewing line has a shape that is curved at the both sides of the upper and lower overlap vents, it is also possible to have a shape that is linearly bent.

Further, in the embodiments explained above, the examples in which the airbag device 100 according to the present invention is applied to the motor vehicle are explained. However, it is also possible to be applied to an airplane and a ship in addition to the motor vehicle and the same effect can be obtained.

INDUSTRIAL APPLICABILITY OF THE INVENTION

The present invention can be utilized to a side airbag device that restrains a vehicle occupant from a side.

What is claimed is:

1. A side airbag device comprising:
    an airbag cushion formed in a bag shape by combining an outer panel located at an outer side in a vehicle width direction and an inner panel located at an inner side in the vehicle width direction;
    a baffle spanning between the outer panel and the inner panel in an inside of the airbag cushion, the baffle partitioning the inside of the airbag cushion into a front chamber located at a vehicle front side and a rear chamber located at a vehicle rear side;
    an inflator disposed in the rear chamber;
    an inner tube circumferentially surrounding the inflator; and
    a plurality of tethers extending from the baffle toward a vehicle rear, the plurality of tethers including first and second tethers that each extend from a common point on the baffle, extend around opposite sides of the inflator in the vehicle width direction, and connect with a rear end of the airbag cushion,
    wherein the first tether is disposed between the inner tube and the outer panel and the second tether is disposed between the inner tube and the inner panel,
    wherein the first and second tethers are both attached to the baffle and a rear end of the airbag cushion,
    wherein each of the first tether, the second tether and the inner tube is directly attached to the rearmost part of the cushion where the inner panel joins the outer panel.

2. The side airbag device according to claim 1,
    wherein the baffle includes first and second members that are independently provided as cloth materials,
    each of the first and second members is a band-shaped member, first sides of longitudinal sides of the band-shaped members are respectively connected to the outer panel and the inner panel, and second sides of longitudinal sides of the band-shaped members are connected to each other, and
    the baffle is mountain-fold-shaped as the second sides form an apex when viewed from the vehicle rear side prior to an expansion and deployment of the airbag cushion.

3. The side airbag device according to claim 2,
    wherein the first and second tethers respectively continuously extend from the second sides of the first and second members as parts of the baffle.

4. The side airbag device according to claim 1, wherein lengths of the first and second tethers are respectively shorter than lengths from connection points between the baffle and the outer and inner panels to the rear end of the airbag cushion.

5. The side airbag device according to claim 1, wherein the airbag cushion further includes a lower chamber, and wherein the inner tube guides gas from the inflator to the rear chamber and the lower chamber.

6. The side airbag device according to claim 1, wherein the inner tube has a tubular shape and extends in a vehicle vertical direction around the inflator.

7. The side airbag device according to claim 1, wherein the inner tube receives gas from the inflator and is expanded and deployed to a cylindrical shape by the inflator.

8. The side airbag device according to claim 1, wherein the inner tube and the inflator are vertically elongated.

9. The side airbag device according to claim 1, further comprising a lower chamber and a further baffle partitioning the lower chamber from the front chamber and the rear chamber.

10. The side airbag device according to claim 9, wherein the rear chamber vertically extends along a rear side of the airbag cushion, the lower chamber is disposed below the rear chamber, and the front chamber extends along a front side of the airbag cushion and is vertically disposed between the rear chamber and the lower chamber.

11. The side airbag device according to claim 9, wherein the inner tube penetrates the further baffle and extends from the rear chamber to the lower chamber for guiding gas in a vehicle up direction into the rear chamber and a vehicle down direction into the lower chamber.

12. The side airbag device according to claim 1, wherein a front end of the inner tube floats freely relative to the baffle.

13. The side airbag device according to claim 1, wherein the first and second tethers are both connected to the baffle and the rear end of the airbag cushion such that a space defined laterally between the first and second tethers laterally bisects the rear chamber of the airbag cushion.

14. A side airbag device comprising:
    an airbag cushion formed in a bag shape by combining an outer panel located at an outer side in a vehicle width direction and an inner panel located at an inner side in the vehicle width direction;
    a first baffle spanning between the outer panel and the inner panel in an inside of the airbag cushion, the first baffle partitioning the inside of the airbag cushion into a front chamber located at a vehicle front side and a rear chamber located at a vehicle rear side;
    a second baffle spanning between the outer panel and the inner panel in the inside of the airbag cushion, the second baffle partitioning the front chamber and the rear chamber from a lower chamber,
    an inflator disposed in the rear chamber;
    an inner tube circumferentially surrounding the inflator; and
    a plurality of tethers extending from the first baffle to a rear end of the airbag cushion, the plurality of tethers including first and second tethers that extend around opposite sides of the inflator and the inner tube in the vehicle width direction,
    wherein the rear chamber vertically extends along a rear side of the airbag cushion, the lower chamber is disposed below the rear chamber, and the front chamber extends along a front side of the airbag cushion and is vertically disposed between the rear chamber and the lower chamber, and
    wherein the inner tube penetrates the second baffle and extends from the rear chamber to the lower chamber for guiding gas in a vehicle up direction into the rear chamber and a vehicle down direction into the lower chamber.

15. The side airbag device according to claim 14, wherein the first tether is disposed between the inner tube and the outer panel and the second tether is disposed between the inner tube and the inner panel.

16. The side airbag device according to claim 15, wherein the first and second tethers both extend from a common point on the first baffle.

17. A side airbag device comprising:
an airbag cushion formed in a bag shape by combining an outer panel located at an outer side in a vehicle width direction and an inner panel located at an inner side in the vehicle width direction;
a baffle spanning between the outer panel and the inner panel in an inside of the airbag cushion, the baffle partitioning the inside of the airbag cushion into a front chamber located at a vehicle front side and a rear chamber located at a vehicle rear side;
an inflator disposed in the rear chamber;
an inner tube circumferentially surrounding the inflator;
comprising a lower chamber and a further baffle partitioning the lower chamber from the front chamber and the rear chamber; and
a plurality of tethers extending from the baffle toward a vehicle rear, the plurality of tethers including first and second tethers that each extend from a common point on the baffle, extend around opposite sides of the inflator in the vehicle width direction, and connect with a rear end of the airbag cushion,
wherein the first tether is disposed between the inner tube and the outer panel and the second tether is disposed between the inner tube and the inner panel,
wherein the first and second tethers are both attached to the baffle and a rear end of the airbag cushion, and
wherein the inner tube penetrates the further baffle and extends from the rear chamber to the lower chamber for guiding gas in a vehicle up direction into the rear chamber and a vehicle down direction into the lower chamber.

* * * * *